(12) United States Patent
Barnes et al.

(10) Patent No.: US 10,577,991 B2
(45) Date of Patent: Mar. 3, 2020

(54) FLUID SYSTEM AND METHOD

(71) Applicant: Castrol Limited, Pangbourne, Reading (GB)

(72) Inventors: Andrew Phillip Barnes, Norfolk (GB); Peter Stuart Brett, Berkshire (GB); Steven Paul Goodier, Berkshire (GB); Timothy Hugh Lake, Berkshire (GB); Mark O'Malley, Norfolk (GB); Oliver Paul Taylor, Berkshire (GB); David John Roach Williams, Berkshire (GB)

(73) Assignee: Castrol Limited, Reading (GB)

( * ) Notice: Subject to any disclaimer, the term of this patent is extended or adjusted under 35 U.S.C. 154(b) by 312 days.

(21) Appl. No.: 15/312,907

(22) PCT Filed: May 21, 2014

(86) PCT No.: PCT/GB2014/051566
§ 371 (c)(1),
(2) Date: Nov. 21, 2016

(87) PCT Pub. No.: WO2015/177488
PCT Pub. Date: Nov. 26, 2015

(65) Prior Publication Data
US 2017/0183992 A1    Jun. 29, 2017

(51) Int. Cl.
*F01M 11/04* (2006.01)
*F01M 11/10* (2006.01)
(Continued)

(52) U.S. Cl.
CPC ............. *F01M 11/04* (2013.01); *F01M 11/10* (2013.01); *F02D 41/26* (2013.01); *F01M 2011/0095* (2013.01)

(58) Field of Classification Search
CPC .......... F01M 11/04; F01M 11/10; F02D 41/26
See application file for complete search history.

(56) References Cited

U.S. PATENT DOCUMENTS

| 621,673 A | 3/1899 | Hotchkiss |
| 4,151,823 A | 5/1979 | Grosse et al. |
| (Continued) | | |

FOREIGN PATENT DOCUMENTS

| CN | 100538026 | 9/2009 |
| DE | 102012024365 | 6/2014 |
| (Continued) | | |

*Primary Examiner* — Michael A Riegelman
(74) *Attorney, Agent, or Firm* — McDonnell Boehnen Hulbert & Berghoff LLP

(57) ABSTRACT

A method is described of supplying liquid to a liquid delivery system in a vehicle. A a replaceable liquid container including a reservoir containing liquid is releasably coupled in the vehicle to provide fluidic communication between the reservoir and a liquid delivery system of the vehicle during operation of the vehicle. The method includes the steps of: (i) prior to establishing liquid communication between the reservoir and the liquid delivery system of a selected vehicle, communicating with a data carrier carried by the container and determining data associated with at least one of the container and its contents; and (ii) using the data in an analysis of suitability of the container and/or content of the container for the selected vehicle and generating a suitability output, and (iii) establishing liquid communication between the reservoir and liquid delivery system of the selected vehicle in dependence on the suitability output.

23 Claims, 11 Drawing Sheets

(51) Int. Cl.
    *F02D 41/26*    (2006.01)
    *F01M 11/00*    (2006.01)

(56) References Cited

U.S. PATENT DOCUMENTS

| | | | |
|---|---|---|---|
| 4,412,515 A | 11/1983 | Fritzenwenger | |
| 5,454,354 A | 10/1995 | Miller | |
| 5,554,278 A * | 9/1996 | Henderson | F01M 11/04 123/575 |
| 5,640,936 A | 6/1997 | Hudson | |
| 8,061,383 B2 * | 11/2011 | Gouzou | F02D 19/12 123/1 A |
| 9,869,219 B2 | 1/2018 | Barnes et al. | |
| 9,878,822 B2 | 1/2018 | Barnes et al. | |
| 9,890,901 B2 | 2/2018 | Brett et al. | |
| 9,938,867 B2 | 4/2018 | Brett et al. | |
| 2002/0023691 A1 | 2/2002 | Capstran | |
| 2004/0079589 A1 * | 4/2004 | Schneider | F01M 9/02 184/1.5 |
| 2004/0211470 A1 | 10/2004 | Apostolides | |
| 2005/0161628 A1 | 7/2005 | Tiberghien et al. | |
| 2006/0186031 A1 | 8/2006 | Fick et al. | |
| 2007/0050095 A1 | 3/2007 | Nelson et al. | |
| 2008/0088127 A1 | 4/2008 | Tiberghien et al. | |
| 2008/0179139 A1 | 7/2008 | Montgomery | |
| 2008/0265574 A1 | 10/2008 | Tiberghien et al. | |
| 2009/0303466 A1 * | 12/2009 | Arakawa | F02D 19/0628 356/128 |
| 2011/0048857 A1 * | 3/2011 | McGilvray | F01M 9/02 184/6.12 |
| 2011/0068954 A1 | 3/2011 | McQuade et al. | |
| 2011/0253092 A1 | 10/2011 | Springer et al. | |
| 2012/0006725 A1 | 1/2012 | Soderlund | |
| 2012/0046920 A1 * | 2/2012 | Blossfeld | F01M 1/18 703/2 |
| 2012/0265429 A1 * | 10/2012 | Perera | F02D 29/04 701/123 |
| 2015/0053505 A1 * | 2/2015 | Klowak | F01M 11/061 184/105.1 |
| 2015/0292372 A1 | 10/2015 | Barnes et al. | |
| 2015/0338386 A1 * | 11/2015 | Chapman, III | G01N 33/2888 702/50 |
| 2017/0089234 A1 | 3/2017 | Dawson et al. | |
| 2017/0089235 A1 | 3/2017 | Dawson et al. | |
| 2017/0089236 A1 | 3/2017 | Andersen et al. | |
| 2017/0101911 A1 | 4/2017 | Barnes et al. | |
| 2017/0107873 A1 | 4/2017 | Ali et al. | |
| 2017/0122151 A1 | 5/2017 | Brett et al. | |
| 2017/0183992 A1 * | 6/2017 | Barnes | F01M 11/04 |
| 2017/0190466 A1 | 7/2017 | Andersen et al. | |
| 2017/0197596 A1 | 7/2017 | Barnes et al. | |
| 2018/0274408 A1 * | 9/2018 | Goodier | F01M 11/12 |

FOREIGN PATENT DOCUMENTS

| | | |
|---|---|---|
| EP | 0807748 | 11/1997 |
| JP | H11-287395 | 10/1999 |
| JP | 2009-013988 | 1/2009 |
| SU | 1214508 | 2/1986 |
| SU | 1778326 | 11/1992 |
| WO | WO 98/43732 | 10/1998 |
| WO | 01/53663 | 7/2001 |
| WO | WO 2005/005792 | 1/2005 |
| WO | WO 2016/158971 | 10/2016 |

\* cited by examiner

FLUID SYSTEM AND METHOD

CROSS REFERENCE TO RELATED APPLICATION

This application is a National Phase application of, and claims the benefit of, International (PCT) Application No. PCT/GB2014/051566, filed on May 21, 2014, the entire contents of which is incorporated herein by reference.

This invention relates to a fluid delivery system. Aspects of the invention relate to a container and method for use in relation to a fluid delivery system. Examples of aspects relate to a fluid delivery system for a vehicle or other machine. Examples relate to a liquid circulation system for a vehicle engine.

Many vehicle engines use one or more fluids for their operation. Such fluids are often liquids. For example, internal combustion engines use liquid lubricating oil compositions. Also, electric engines use heat exchange liquids for example to cool the engine, to heat the engine or to cool and heat the engine during different operating conditions. Such fluids are generally held in reservoirs associated with the engine.

Particular engines may be designed to operate with particular fluids.

WO 01/53663 describes a removable and disposable oil cartridge device linked to an internal combustion engine regulating interface for manually filling or emptying and automatically regulating the engine lubricating oil. WO 01/53663 describes a continuous sensing system concerning the oil level in the engine crankcase.

US 2007/0050095 describes an engine management system.

There remains a need for a replaceable fluid container for an engine, for example a vehicle engine which seeks to avoid or at least mitigate problems such as inappropriate use of components or incorrectly fitting of components when replenishing/replacing a fluid supply to an engine.

According to an aspect of the invention there is provided a method of supplying liquid to a liquid delivery system in a vehicle in which a replaceable liquid container including a reservoir containing liquid is releasably coupled in the vehicle to provide fluidic communication between the reservoir and a liquid delivery system of the vehicle during operation of the vehicle, the method including the steps of:
(i) prior to establishing liquid communication between the reservoir and the liquid delivery system of a selected vehicle, communicating with a data carrier carried by the container and determining data associated with at least one of the container and its contents; and
(ii) using the data in an analysis of suitability of the container and/or content of the container for the selected vehicle and generating a suitability output, and
(iii) establishing liquid communication between the reservoir and liquid delivery system of the selected vehicle in dependence on the suitability output.

In this way, an analysis can be carried out on the container before the liquid is supplied to the vehicle and a determination made as to the suitability of the container and/or liquid inside it for a particular vehicle, or type of vehicle. This can reduce the risk of putting incompatible or incorrect liquid in the vehicle. Alternatively, or in addition, an analysis can be made before installation of the container in the vehicle as to whether or not the container is suitable for that vehicle or, for example, for the coupling arrangement in the vehicle. Alternatively, or in addition, an analysis can be made before installation of the container in the vehicle as to the condition of the container, or its history. Preferably data relating to the container and/or liquid in the container is stored in the data carrier.

For example, if the analysis of the data generates a negative suitability output, for example if the liquid is not compatible with the vehicle, then the installation of the container into the vehicle can be prevented or aborted. For example, if the analysis generates a positive suitability output, then the process for the installation proceeds.

In examples of aspects of the invention, the container remains coupled to the liquid delivery system during operation of the vehicle. Where the liquid delivery system comprises a liquid circulation system, a part of the container may form an element of the circulation path. For example, some or all of the liquid circulating in the liquid circulation system may flow via the reservoir of the container.

In some examples, the liquid is an ancillary liquid of the vehicle. For example, the liquid may comprise a lubricant.

The liquid may be selected from the group consisting of a lubricant, a hydraulic fluid, a pneumatic fluid, a washer fluid, a fuel additive. The liquid delivery system may comprise a fluid circulation system.

In some examples of the invention, the container provides a part of the fluid circulation system when the container is installed in the vehicle.

The liquid delivery system may comprise a lubricant system. For example, the lubricant system may be for an engine.

The communication with the data carrier of the container may be carried out by a device associated with the vehicle. For example, a physical data connection may be established between the data carrier of the container and the vehicle, or between the data carrier and a remote device for example a computer device. In other examples, preferably the data connection is established wirelessly.

The method may further include one or more of: providing data to and/or receiving data from the data carrier of the container, providing data to and/or receiving data from the vehicle, providing data to and/or receiving data from an engine control device of the vehicle.

It is envisaged that aspects of the invention may find application other than in vehicles, for example in static machinery. The invention may find application for example in wind turbines, for example for a lubricant system, or for machinery, for example industrial machinery, or other applications for example in lawnmowers.

Therefore a further aspect of the invention provides a method of supplying fluid to a fluid delivery system of a machine in which a replaceable fluid container including a reservoir containing fluid is releasably coupled in the machine to provide fluidic communication between the reservoir and a fluid delivery system of the machine during operation of the machine, the method including the steps of:
(i) prior to establishing fluid communication between the reservoir and the fluid delivery system of a selected machine, communicating with a data carrier (the data carrier optionally being carried by the container, or located elsewhere) and determining, on the basis of the communication with the data carrier, data associated with at least one of the container and its fluid contents.

The data may be further used in an analysis of suitability of the container and/or the fluid in the container for the selected machine and generating a suitability output, and establishing fluid communication between the reservoir and fluid delivery system of the selected machine in dependence on the suitability output.

It is envisaged that the data in the data carrier might be used other than for assessing suitability of the container and/or fluid. For example, the data may be read and transferred to a data store, control unit or other in the vehicle or machine. Data relating to the type, history, or condition of the container and/or liquid for example may be stored in the vehicle or machine as a historical record of the fluids used in the vehicle or machine. Alternatively or in addition, data may be used, for example in the operation of the vehicle or machine. For example, information relating to the type of fluid in the fluid delivery device of the vehicle or machine may be used to determine a parameter for use of the vehicle or the machine. For example, if a lower performance fluid were used, the operation of the vehicle or machine may be restricted or adapted in dependence on an assessment of the fluid performance.

The method may further include the step of controlling at least one parameter of the operation of the vehicle or machine in dependence on the data associated with at least one of the container, and its fluid contents.

The method may include using the information from the data to determine a mode or parameter of operation of the machine or vehicle.

The method may include the step of communicating data between the container and a remote communications device. For example, the determination of the suitability of the container and/or fluid, and/or other analysis of data may be carried out remotely from the container and/or the vehicle or machine. For example, a remote computer device may be used. A data connection between the container, the remote device and/or the vehicle or machine may be wired or wireless. Data communication may be over a telecommunications network, Internet or other communication means.

The method may include the step of sensing at least one property of a liquid or fluid in the reservoir of the container, wherein the data comprises data based on the sensed property of the fluid. The property of the fluid may include at least one property selected from the group consisting of: the amount of fluid, the temperature of fluid, the pressure of fluid, the viscosity of fluid, the density of fluid, the electrical resistance of fluid, the dielectric constant of fluid, the opacity of fluid, the chemical composition of fluid and combinations of two or more thereof.

The data carrier may comprise a memory for storing data. The stored data may relate to at least one property of the fluid selected from the group consisting of: the amount of fluid, the temperature of fluid, the pressure of fluid, the viscosity of fluid, the viscosity index of the fluid, the density of fluid, the electrical resistance of fluid, the dielectric constant of fluid, the opacity of fluid, the chemical composition of fluid, the origin of the fluid and combinations of two or more thereof.

The stored data may comprise data based upon at least one sensed property of the fluid as described herein.

The container may receive data from a remote device and perform an action selected from the list consisting of: storing the received data in memory; and providing data to the vehicle, for example an engine control device, in response to the received data.

The analysis of the data may be carried out remote from the container. For example, the analysis, or other steps of the method may be carried out on-board the vehicle, and/or may be carried out remote from the vehicle.

In some examples, a controller may be located on or in the container. Some or all of the analysis or other steps of the method may be carried out on-board the container. For example a "smart" container may carry out the analysis of the suitablility of the liquid for the vehicle. Alternatively or in addition, the container may include an actuator for switching the container between an active or couplable state and an inactive state or one in which the container may not be coupled to the fluid delivery system, in dependence on the suitability output. For example, the container may include an internal valve for allowing or preventing flow of fluid, the container opening the internal valve if the container and vehicle are identified as being compatible. An actuator may be powered by an on-board power source, for example a battery, and/or may use power from the vehicle after or during installation of the container.

Also provided by an aspect of the invention is a container for use in a method as described herein.

Also provided by an aspect of the invention is a replaceable liquid container for supplying liquid to a liquid delivery system in a vehicle in which the replaceable liquid container includes a reservoir for containing liquid, wherein the container is adapted to be releasably coupled in the vehicle to provide fluidic communication between the reservoir and a liquid delivery system of the vehicle during operation of the vehicle, the container also including a data carrier including data associated with at least one of the container and its content.

The container may comprise a sensor adapted to sense at least one property of a fluid in the reservoir of the container. The property of the fluid may include at least one property selected from the group consisting of: the amount of fluid, the temperature of fluid, the pressure of fluid, the viscosity of fluid, the density of fluid, the electrical resistance of fluid, the dielectric constant of fluid, the opacity of fluid, the chemical composition of fluid and combinations of two or more thereof.

The container may also include memory for storing data.

Also provided by an aspect of the invention is a replaceable fluid container for an engine comprising:
a reservoir for holding a fluid;
a fluid coupling adapted to provide fluidic communication between the reservoir and a fluid circulation system of an engine during operation of the engine; and
a data carrier arranged for data communication with a communications device prior to the positioning of the container to permit fluidic communication between the reservoir and the fluid circulation system of the engine.

Providing for data communication between the container and a remote device before positioning of the container can enable the identification of information relating to the container prior to fluid in the container being supplied to the fluid circulation system of the engine. Thus a pre-installation review of the information can be made. The information may include information about the container and/or its contents, for example one or more of for example the type of container or its history or condition, and the fluid, its history and its suitability for the fluid circulation of the engine, or for a type of engine.

Also provided by an aspect of the invention is a method of supplying fluid to a fluid delivery system in an apparatus in which a replaceable fluid container including a reservoir containing fluid is releasably coupled in the apparatus to provide fluidic communication between the reservoir and a fluid delivery system of the apparatus during operation of the apparatus, the method including the steps of:
(i) communicating with a data carrier carried by the container and determining, on the basis of the data communication with the data carrier, data associated with at least one of the container and its liquid contents.

The fluid may comprise an ancillary fluid of the apparatus. The fluid may for example be selected from the group consisting of a lubricant, a hydraulic fluid, a pneumatic fluid, a washer fluid, a fuel additive.

The apparatus may comprise an engine, or an electrical generation apparatus. For example, the apparatus may comprise a movable or stationary machine. The apparatus may comprise a vehicle, for example a car. The apparatus may comprise a wind turbine.

Also provided by the invention is a computer implemented method of assessing containers containing fluid in a system for installation of containers into vehicles, the method comprising:
receiving, at a container assessment device, a signal indicating that the fluid container is present;
identifying a vehicle into which the container is to be installed;
in response to the received signal performing the following actions:
obtaining data from a memory at the container, the data including information relating to a characteristic of the container and/or the fluid in the container;
assessing the suitability of the container for installation into the vehicle; and, in dependence on the assessed suitability, generating an installation instruction for the installation of the container into the vehicle.

The computer implemented method may further comprise sensing at least one property of a fluid in a reservoir of the container, wherein the data is based on the sensed property.

Also provided by an aspect of the invention is a computer readable medium comprising program instructions operable to program a processor to perform a method described herein.

The invention further provides a container assessment device for assessing containers containing fluid in the method of aspects of the present invention. The device may be partly or fully present in the apparatus, machine or vehicle and/or in a device remote from the apparatus, machine or vehicle.

Also provided by the invention is a replaceable fluid container for an engine comprising:
a reservoir for holding a fluid;
a fluid coupling adapted to provide fluidic communication between the reservoir and a fluid circulation system of an engine; and
a data provider arranged for data communication with a remote communications device prior to positioning the container to permit fluidic communication between the reservoir and the fluid circulation system of the engine.
In a related aspect of the invention there is provided a replaceable fluid container for an engine comprising: a reservoir for holding a fluid; a fluid coupling adapted to provide fluidic communication between the reservoir and a fluid circulation system of an engine; and a data provider arranged such that positioning the container to permit fluidic communication between the reservoir and the fluid circulation system of the engine arranges the data provider for data communication with an engine control device of the engine.

This and other aspects of the disclosure enable operation of the engine to be inhibited where a fluid container has not been properly coupled in fluidic communication with the fluid circulation system of an engine.

In other examples, operation of the engine might be inhibited, or altered in some manner, for example if a pre-installation analysis had identified that the container and/or fluid were unsuitable, or sub-optimal for the engine or other component. For example, if a sub-optimal lubricant in an engine were used, the power or other characteristic of the operation of the engine might be limited. Similarly, if the use of a premium fluid, or one having particular advantageous properties were identified, then the operation of the engine or other component might be altered, for example enhanced.

According to another aspect of the present invention there is also provided a computer implemented method of facilitating control of an engine, the method comprising: receiving, at a fluid container, a signal indicating that the fluid container is coupled to the engine; in response to the received signal performing an action selected from the list consisting of: providing data to an engine control device; and, providing data to a memory at the fluid container. This and other aspects enable engine fluids to be easily replaced for example by a consumer whilst reducing the risk that consumers will use inappropriate fluids and/or enabling the use of the container to be recorded for example at an engine control device and/or at the container, to inform for example, subsequent diagnostics and maintenance.

In another aspect of the present invention there is also provided a replaceable fluid container for an engine comprising: a reservoir for holding a fluid; at least one self-sealing coupling adapted to connect said reservoir in fluidic communication with a fluid circulation system of an engine and a data module adapted to communicate data with an engine control device when the reservoir is in fluidic communication with said fluid circulation system.

Communication of data may comprise one of: providing data to the control device; and receiving data from the control device. The data provider may be arranged to inhibit communication with the control device unless the reservoir is in fluidic communication with the fluid circulation system. The data provider may be arranged such that positioning the container to permit fluidic communication with the fluid circulation system also couples the data provider in data communication with the control device. The container may be configured so that arranging the container to permit fluid communication enables the data provider to be connected for communication with the engine. This connection may be provided by the arrangement of the container but may also require some additional further action to make the connection, such as throwing a switch.

These and other examples of the disclosure may provide an interlock to inhibit operation of an engine unless a selected type of fluid container has been correctly coupled to the engine.

The data may include data stored on a data carrier for example associated with the container. This data may for example be accessed before, during or after installation of the fluid container in the vehicle or other location.

Arranging the container to permit fluidic communication may comprise connecting the reservoir in fluidic communication with the fluid circulation system via the fluid coupling. The fluid coupling may comprise a self-sealing coupling arranged such that connecting the self-sealing coupling to the fluid circulation system arranges the data provider for communicating data with the control device. The data provider may be operable to communicate by at least one of: providing data to the control device; and receiving data from the control device. The data provider may be configured to communicate with the control device in response to the fluid coupling being coupled to the fluid circulation system. The data may comprise at least one property of the fluid in the reservoir of the container.

The control device may, in some examples be located remote from the container. For example, the control device may be on board the engine or vehicle, or may be mounted remote, connected by a data communications link.

The container may comprise a sensor adapted to sense at least one property of a fluid in the reservoir of the container and the data provided to the control device may comprise data based on the sensed property of the fluid. The sensed property of the fluid may be at least one property selected from the group consisting of: the amount of fluid, the temperature of fluid, the pressure of fluid, the viscosity of fluid, the density of fluid, the electrical resistance of fluid, the dielectric constant of fluid, the opacity of fluid, the chemical composition of fluid and combinations of two or more thereof. The amount of fluid includes the absence of the fluid. Thus, the sensor may sense that there is no fluid in the reservoir and the data provided to the control device comprises data based on at least one sensed property which includes the absence of fluid in the reservoir of the container.

The data provider may comprise at least one printed circuit board (sometimes called a PCB). In some examples the PCB is adapted to communicate with the control device through electrical contacts on the replaceable container adapted to engage corresponding contacts on or associated with the engine.

The data provider may comprise at least one computer readable identifier for identifying the fluid, the identifier may be an electronic identifier, such as a PCB, a near field RF communicator, for example a passive or active RFID tag, or an NFC communicator. RF stands for radio Frequency. RFID stands for Radio Frequency IDentification. NFC stands for Near Field Communication. The computer readable identifier may be an optical identifier, such as a barcode, for example a two-dimensional barcode, or a colour coded marker, or optical identifier on the container. The computer readable identifier may be provided by a shape or configuration of the container.

The data provider may comprise at least one a memory. The memory may store data comprising at least one property of the fluid selected from the group consisting of: the amount of fluid, the temperature of fluid, the pressure of fluid, the viscosity of fluid, the viscosity index of the fluid, the density of fluid, the electrical resistance of fluid, the dielectric constant of fluid, the opacity of fluid, the chemical composition of fluid, the origin of the fluid and combinations of two or more thereof. The amount of fluid includes the absence of the fluid.

The stored data may comprise data based upon at least one sensed property of the fluid. The data provider may be adapted to communicate with the control device by providing data to the control device which data comprises at least part of the stored data.

The data provider may be adapted to receive data from the control device and to provide data to the control device in response to the received data. Where the data provider comprises a memory, the memory may be adapted to store data selected from the group consisting of: data received from the control device; data which comprises at least one property of a fluid in the reservoir of the container. Data received from the control device may comprise at least one piece of data selected from the group consisting of an engine operating condition, a predicted service interval and combinations thereof.

In computer implemented methods of the present disclosure, providing data to a memory at the fluid container may comprise storing data obtained from the control device in the memory. Where data is provided into memory in response to a received signal, the data may comprise data obtained from the received signal, and/or data obtained from a further signal received from an engine control device, and/or data obtained from a sensor at the container.

Providing data to a control device may comprise providing data relating to the fluid container, and the data may comprise at least one property of a fluid in a reservoir of the container. For example, such methods may comprise sensing at least one property of the fluid in the reservoir of the container; and providing the sensed data to the control device. Providing data to a control device may comprise obtaining the data from memory at the fluid container.

The data provider may comprise a data module. The data module may be encapsulated, and it may be provided as a single unit however this is optional and the data module need not be encapsulated. In addition, the term module should not be taken to imply a single unit or element, it will be appreciated by the skilled addressee in the context of the present disclosure that the module may comprise a plurality of elements which may be distributed about, or integrated within, or otherwise carried by one or more elements of the container.

According to at least some embodiments of the present invention, communication of data between the data module of a fluid container and the engine control device is dependent upon the presence of fluidic communication between the fluid container and a fluid circulation system of the engine. According to at least some embodiments, the data module is adapted such that data is not communicated with the engine control device unless the reservoir is in fluidic communication with the fluid circulation system of the engine. This may enable a type of safety interlock to give reliable engine control, for example based on properties of the fluid, whilst also allowing engine fluids to be quickly and conveniently replaced.

In other examples, the data module may alternatively, or in addition, provide for communication of data before installation of the container, or during installation, and/or at other times.

According to at least some embodiments, the data module is adapted to communicate data with the control device by providing data to the control device. This may enable control of the engine operation based upon properties of the fluid.

Alternatively, or in addition, this may enable an assessment to be made, before, during or after installation of the container of suitability of the container and/or its contents for installation in a particular location, for example on a particular vehicle.

Thus, according to at least some embodiments the data module is adapted to communicate data with the engine control device by providing data to the engine control device, which data comprises at least one property of the fluid in the reservoir of the container.

This may enable control of the engine operation based upon properties of the fluid. Thus in at least some embodiments, operation of the engine is adjusted, for example by the engine control device, in response to at least one property of the fluid in the reservoir of the container.

According to at least some embodiments the container comprises a sensor adapted to sense at least one property of the fluid in the reservoir of the container and the data module is adapted to communicate data with the engine control device by providing data to the engine control device, which data comprises data based on at least one sensed property of the fluid in the reservoir of the container.

Examples of suitable properties of fluid in the reservoir of the container which are sensed include: the amount of fluid, the temperature of fluid, the pressure of fluid, the viscosity of fluid, the density of fluid, the electrical resistance of fluid, the dielectric of fluid, the opacity of fluid, the chemical composition of fluid and combinations of two or more thereof. The amount of fluid includes the absence of the fluid. Thus, the sensor may sense that there is no fluid in the reservoir and the data module is adapted to communicate data with the engine control device by providing data to the control device, which data comprises data based on at least one sensed property which includes the absence of fluid in the reservoir of the container.

Thus in at least some embodiments, operation of the engine is adjusted for example by the engine control device, in response to at least one sensed property of the fluid in the reservoir of the container, for example in response to changes of at least one sensed property of the fluid in the reservoir of the container.

Alternatively, or in addition, this may enable an assessment to be made, before, during or after installation of the container of suitability of the container and/or its contents for installation in a particular location, for example on a particular vehicle.

According to at least some embodiments the data module comprises a memory adapted to store data which comprises at least one property of the fluid in the reservoir of the container.

In at least some embodiments the memory is adapted to store at least one property of the fluid which includes: the amount of fluid, the temperature of fluid, the pressure of fluid, the viscosity of fluid, the viscosity index of the fluid, the density of fluid, the electrical resistance of fluid, the dielectric of fluid, the opacity of fluid, the chemical composition of fluid, the origin of the fluid, an identifier of the fluid in the reservoir, the grade of the fluid, the date on which the fluid was filled or replaced in the reservoir and combinations of two or more thereof. The amount of fluid which is stored may include the absence of the fluid.

According to at least some embodiments the memory is adapted to store data which comprises at least one property of the fluid in the reservoir which is an initial property of the fluid in the reservoir. In at least some examples, this initial property data is pre-programmed into the memory.

Examples of suitable initial properties of the fluid in the reservoir of the container which are stored include: the amount of fluid, the temperature of fluid, the pressure of fluid, the viscosity of fluid, the viscosity index of the fluid, the density of fluid, the electrical resistance of fluid, the dielectric of fluid, the opacity of fluid, the chemical composition of fluid, the origin of the fluid, an identifier of the fluid in the reservoir and combinations of two or more thereof. The amount of fluid includes the absence of the fluid.

According to at least some embodiments the memory is adapted to store data which comprises data based upon at least one sensed property of the fluid in the reservoir of the container.

Examples of suitable sensed properties of the fluid in the reservoir of the container on which stored data are based include: the amount of fluid, the temperature of fluid, the pressure of fluid, the viscosity of fluid, the density of fluid, the electrical resistance of fluid, the dielectric of fluid, the opacity of fluid, the chemical composition of fluid and combinations of two or more thereof. The amount of fluid includes the absence of the fluid.

According to at least some embodiments the memory is adapted to store data which comprises both initial property data and sensed property data. In at least some embodiments the memory is adapted to store data which is derived (for example by the data module) from initial property data and sensed property data, for example the difference between an initial property data and a corresponding sensed property data. Examples of the stored data which is stored by the memory of the data module include: at least one property of the fluid in the reservoir which is an initial property of the fluid in the reservoir; at least one sensed property of the fluid in the reservoir of the container; data which is derived from initial property data and sensed property data, for example the difference between an initial property data and a corresponding sensed property data; data characteristic of the fluid in the reservoir of the container; and combinations of two or more thereof.

According to at least some embodiments the data module comprises a memory adapted to store data which comprises at least one property of the container.

According to at least some embodiments the memory is adapted to store data which comprises at least one initial property of the container.

In at least some embodiments the memory is adapted to store data which includes: the date on which the fluid in reservoir was filled or replaced, a unique identifier of the container, an indication of whether the container is new, or has previously been refilled or replaced, an indication of the operating duration of the fluid and/or engine (for example, the vehicle mileage if the engine is a vehicle engine), the number of times the container has been refilled or reused, and the total the operating duration of the container (for example, the vehicle mileage if the engine is a vehicle engine).

In at least some embodiments the data module is adapted to communicate with the control device by providing data to the control device which data comprises at least part of the stored data. Examples of the stored data which is provided to the control device by the data module include: properties of the fluid in the reservoir; initial properties of the fluid in the reservoir; sensed properties of the fluid in the reservoir; data which is derived from initial property data and sensed property data; data characteristic of the fluid in the reservoir of the container; an identifier of the fluid in the reservoir; the date on which the fluid in reservoir was filled or replaced; a unique identifier of the container; an indication of whether the container is new; or has previously been refilled or replaced; an indication of the operating duration of the fluid and/or engine (for example; the vehicle mileage if the engine is a vehicle engine); the number of times the container has been refilled or reused; the total the operating duration of the container (for example, the vehicle mileage if the engine is a vehicle engine) and combinations of two or more thereof.

This may enable identification of a need for the fluid to be changed.

This may also enable a service interval of the engine to be determined and/or adjusted, for example, by the data module and/or by the engine control device.

According to at least some embodiments the stored data comprises an identifier of the fluid. This may enable the engine control device to adjust operation of the engine dependent on the type of fluid. For example, in at least some embodiments, the control device is configured not to operate unless the provided data indicates that the fluid in the reservoir of the container comprises a selected type of fluid, for example suitable for the operation of the engine. According to at least some embodiments the engine control device is configured to operate the engine in one of two or more modes depending upon the communicated data. For example, if the fluid is an engine crankcase lubricating oil composition, the engine control device is configured to operate the engine in one of two or more modes depending upon the communicated data, for example the type of lubricating oil composition, for example according to the classification system xWy e.g. 5W30 etc.; or the origin of the lubricating oil composition. This may prevent or reduce the risk of inappropriate or counterfeit fluid being used. In some examples the engine control device is configured to operate the engine according to the quality or type of the fluid, the condition of the fluid, the temperature of the fluid, the age of the fluid (including whether it has been used previously), that the correct container has been fitted, whether the container requires replacement.

According to at least some embodiments, the data module is adapted to communicate with the control device by receiving data from the control device.

According to at least some embodiments, the data module is adapted to receive data from the control device and to provide data to the control device in response to the received data. According to some such embodiments, the data module comprises a memory adapted to store data which comprises at least one piece of data received from the control device. Suitably, data received from the engine control device comprises at least one piece of data selected from the group consisting of engine operating conditions, predicted service interval and combinations thereof.

According to at least some embodiments the data module is configured to provide data to the control device in response to data in the form of a signal indicating that the fluid reservoir is fluidic communication with the fluid circulation system.

According to at least some embodiments, the data module is also configured to receive a request signal from the engine control device, for example during operation of the engine, and to provide data to the engine control device in response to the received signal.

According to at least some embodiments, the data module is configured to provide data to the control device at periodic or aperiodic intervals. According to at least some embodiments, the data module is configured to provide data to the control device continuously, for example whilst the engine is operating.

According to at least some embodiments, the data module is configured to provide data based on at least one sensed property of the fluid in the reservoir of the container, to the engine control device in the event that a sensor senses that a property of the fluid in the reservoir of the container has one of a selected number of values, e.g. if a sensed property exceeds a selected range. This may enable the control device to adjust or stop operation of the engine in response to changes in the sensed property of the fluid.

According to another aspect of the present invention there is provided computer implemented method of facilitating control of an engine comprising a fluid circulation system in combination with a container as hereindescribed in which the reservoir of the container is in fluidic communication with the engine fluid circulation system and contains fluid for the engine fluid circulation system, which method comprises providing data from the data provider of the container to the engine control device.

According to at least some embodiments the method further comprises controlling the operation of the engine.

According to at least some embodiments, the method further comprises assessing the suitability of the container and/or its contents for installation in a particular location, for example on a particular vehicle.

According to at least some embodiments, the data provided to the control device comprises at least one property of the fluid in the reservoir of the container. According to at least some embodiments: the container comprises a sensor adapted to sense at least one property of the fluid in the reservoir of the container; the method comprises sensing at least one property of the fluid in the reservoir of the container with the sensor; and the method comprises providing data from the data module of the container to the control device, which data comprises data based on the sensed property of the fluid in the reservoir of the container.

Examples of suitable properties of the fluid in the reservoir of the container which are sensed include: the amount of fluid, the temperature of fluid, the pressure of fluid, the viscosity of fluid, the density of fluid, the electrical resistance of fluid, the dielectric of fluid, the opacity of fluid, the chemical composition of fluid and combinations of two or more thereof. The amount of fluid includes the absence of the fluid.

According to at least some embodiments: the data module comprises a memory; the method comprises storing data in the memory, which data comprises at least one property of the fluid in the reservoir of the container; and the method comprises providing data from the data module to the engine control device, which data comprises at least part of the stored data.

Examples of suitable properties of the fluid in the reservoir of the container which are stored include: the amount of fluid, the temperature of fluid, the pressure of fluid, the viscosity of fluid, the viscosity index of the fluid, the density of fluid, the electrical resistance of fluid, the dielectric of fluid, the opacity of fluid, the chemical composition of fluid, the origin of the fluid, an identifier of the fluid in the reservoir, the grade of the fluid, the date on which the fluid was filled or replaced in the reservoir and combinations of two or more thereof. The amount of fluid includes the absence of the fluid.

In at least some embodiments the memory stores data including: the date on which the fluid was filled or replaced, a unique identifier of the container, an indication of whether the container is new, or has previously been refilled or replaced, an indication of the operating duration of the fluid and/or engine (for example, the vehicle mileage if the engine is a vehicle engine), the number of times the container has been refilled or reused, and the total operating duration of the container (for example, the vehicle mileage if the engine is a vehicle engine).

According to at least some embodiments an initial property of the fluid in the reservoir is stored in the memory. In at least some examples, this initial property data is pre-programmed into the memory. Examples of suitable initial properties of the fluid in the reservoir of the container which are stored include: the amount of fluid, the temperature of fluid, the pressure of fluid, the viscosity of fluid, the viscosity index of the fluid, the density of fluid, the electrical resistance of fluid, the dielectric of fluid, the opacity of fluid, the chemical composition of fluid, the origin of the fluid, an identifier of the fluid in the reservoir and combinations of two or more thereof. The amount of fluid includes the absence of the fluid.

According to at least some embodiments data that is stored in the memory comprises data based upon at least one sensed property of the fluid in the reservoir of the container.

According to at least some embodiments data is stored in the memory which comprises both initial property data and sensed property data. In at least some embodiments data is stored in the memory which is derived (for example by the data module) from initial property data and sensed property data, for example the difference between an initial property data and a corresponding sensed property data. Examples of the stored data which is stored by the memory of the data module include: at least one property of the fluid in the reservoir which is an initial property of the fluid in the reservoir; at least one sensed property of the fluid in the reservoir of the container; data which is derived from initial property data and sensed property data, for example the difference between an initial property data and a corresponding sensed property data; data characteristic of; and combinations of two or more thereof.

In at least some embodiments, the data module communicates with the control device by providing data to the control device which data comprises at least part of the stored data. Examples of the stored data which is provided to the control device by the data module include: properties of the fluid in the reservoir; initial properties of the fluid in the reservoir; sensed properties of the fluid in the reservoir; data which is derived from initial property data and sensed property data; data characteristic of the fluid in the reservoir of the container; an identifier of the fluid in the reservoir; the date on which the fluid in reservoir was filled or replaced; a unique identifier of the container; an indication of whether the container is new; or has previously been refilled or replaced; an indication of the operating duration of the fluid and/or engine (for example; the vehicle mileage if the engine is a vehicle engine); the number of times the container has been refilled or reused; the total the operating duration of the container (for example, the vehicle mileage if the engine is a vehicle engine) and combinations of two or more thereof.

This may enable a need for the fluid to be changed to be identified.

This may also enable a service interval of the engine to be determined and/or adjusted, for example, by the data module and/or by the engine control device.

Alternatively, or in addition, this may enable an assessment to be made, before, during or after installation of the container of suitability of the container and/or its contents for installation in a particular location, for example on a particular vehicle.

Thus, according to at least some embodiments, a service interval of the engine is determined and/or is adjusted in response to the data provided by the data module to the engine control device. According to at least some embodiments, the service interval is determined and/or adjusted by the data module and/or by the control device. Examples of suitable data provided by the data module to the control device include: at least one property of the fluid in the reservoir of the container; data based on at least one sensed property of the fluid in the reservoir of the container; stored data; initial properties of the fluid in the reservoir; sensed properties of the fluid in the reservoir; data which is derived from initial property data and sensed property data; the origin of the fluid; an identifier of the fluid in the reservoir; and combinations of two or more thereof.

Thus, according to at least some embodiments, the stored data comprises an identifier of the fluid which is stored in the memory. This may enable the engine control device to adjust operation of the engine dependent on the type of fluid. For example, in at least some embodiments, the control device does not operate unless the provided data indicates that the fluid in the reservoir of the container comprises a selected type of fluid, for example suitable for the operation of the engine. According to at least some embodiments the control device operates the engine in one of two or more modes depending upon the communicated data. For example, if the fluids is an engine crankcase lubricating oil composition, the control device operates the engine in one of two or more modes depending upon the communicated data, for example the type of lubricating oil composition, for example according to the classification system xWy e.g. 5W30 etc.

According to at least some embodiments: the data module is adapted to communicate with the control device by receiving data from, and providing data to, the control device; and the method comprises receiving data from the control device with the data module and providing data from the data module to the control device in response to the received data. Suitably, data received from the control device comprises at least one piece of data selected from the group consisting of engine operating conditions, predicted service interval and combinations thereof.

In at least some embodiments the data received by the data module is used by the data module to performed some of the data manipulation and/or storage which might otherwise be performed by the engine control device, for example calculating servicing intervals. In at least some examples the data received by the data module is used by the data module to control flow of fluid to and/or from the reservoir, for example if the engine requires the fluid flow to cease because the container/reservoir is to be disconnected from the fluid circulation system.

According to at least some embodiments: the data module is configured to provide data to the engine control device in response to data in the form of a signal indicating that the fluid reservoir is fluidic communication with the fluid circulation system of the engine and the method comprises providing data from the engine control device to the data module in the form of a signal indicating that the fluid reservoir is in fluidic communication with the fluid circulation system of the engine, and providing data from the from the data module to the engine control device.

According to at least some embodiments, in the method, the data module provides data to the engine control device at periodic intervals. According to at least some embodiments, in the method, the data module provides data to the engine control device at aperiodic intervals. According to at least some embodiments, in the method, the data module provides data to the engine control device continuously.

According to at least some embodiments, the data module is configured to provide data based on at least one sensed property of the fluid in the reservoir of the container, to the engine control device in the event that a sensor senses that a property of the fluid in the reservoir of the container has one of a selected number of values, e.g. if a property exceeds a selected range. According to at least some embodiments the method further comprises the engine control device adjusting or stopping operation of the engine in response to changes in at least some of the sensed data.

Examples of suitable properties of the fluid in the reservoir of the container which are sensed include: the amount of fluid, the temperature of fluid, the pressure of fluid, the viscosity of fluid, the density of fluid, the electrical resistance of fluid, the dielectric of fluid, the opacity of fluid, the chemical composition of fluid and combinations of two or more thereof. The amount of fluid includes the absence of the fluid.

According to at least some embodiments the method further comprises the engine control device adjusting or stopping operation of the engine in response to changes in at least some of the data provided by the data module to the engine control device.

In at least some embodiments, the engine control device controls the engine in response to data provided by the data module by for example: limiting the performance features of the engine (for example if the quality or type of the fluid is not particularly suitable for the engine); changing the operation of the engine for example if the fluid is depleted; changing the operation according to the type of the fluid; changing the operation according to the temperature of the fluid; preventing or limiting operation of the engine if the fluid is not of the correct type or origin or has reached the end of its useful life, or if the container is not correctly fitted or if the container has reached the end of its useful life.

In some embodiments the received signal indicates that the reservoir of the container is in fluidic communication with the fluid circulation system of the engine. For example, the fluid container may comprise latches for retaining the reservoir in fluidic communication with the fluid circulation system, and the latches may be configured to provide data in the form of a signal to the data module indicating that the reservoir is in fluidic communication with the fluid circulation system of the engine. The received signal may also be provided by the engine control device. The latch may be part of the one or more self-sealing couplings.

According to some embodiments the data module comprises at least one printed circuit board (sometimes called a PCB). In some examples the PCB is adapted to communicate with the engine control device through electrical contacts on the replaceable container adapted to engage corresponding contacts on or associated with the engine.

According to at least some embodiments the data module comprises a computer readable identifier, for example an electronic identifier. Suitable identifiers include PCB's, radio frequency communicators, such as near field RF communicators, examples of which include NFC communicators (e.g. communicators which support the RF requirements for ISO/IEC 14443A, ISO/IEC 14443 B and FeliCa as outlined in the relevant parts in the ISO 18092) and passive or active radio frequency identification tags (sometimes called RFID tags).

According to another aspect of the present invention there is provided a computer readable medium comprising program instructions operable to program a processor carried by a fluid container to control an engine by performing a method of facilitating control of an engine comprising a fluid circulation system as described herein.

According to at least some embodiments the computer readable medium comprises a non-volatile memory. In at least some embodiments the computer readable medium is carried on a fluid container for fluid for a fluid circulation system of an engine as herein described.

According to another aspect of the present invention there is provided a vehicle comprising:
a replaceable fluid container comprising a reservoir for holding fluid, at least one
self-sealing coupling and a data module fluid;
an engine comprising a fluid circulation system and a control device; in which the reservoir is connected by the self-sealing coupling in fluidic communication with the fluid circulation system of the engine, and the data module is adapted to communicate data with the engine control device.

Suitably, the replaceable fluid container is a container as herein described.

According to at least some embodiments the fluid container comprises an inlet and an outlet for the reservoir. When the engine is operating, fluid flows into the reservoir from the fluid circulation system of the engine through the inlet. When the engine is operating, fluid flows out of the reservoir into the fluid circulation system of the engine through the outlet. The inlet and outlet suitably comprise self-sealing couplings.

According to at least some embodiments the fluid container comprises a vent. Suitably, when the engine is operating the vent is connected in fluidic communication with the engine, for example with the fluid circulation system of the engine. In at least some examples, the engine is an internal combustion engine and when the engine is operating, the vent is in fluid communication with an air inlet manifold of the engine. Suitably, the vent is connected to the engine through a self-sealing coupling. Self-sealing couplings have an advantage in that they facilitate removal and replacement of the replaceable container from and to the engine. When the engine is operating, gas and/or vapour, may flow into and/or out from the reservoir through the vent port or vent ports when the fluid container is connected to the engine fluid circulation system.

Suitably, the fluid container may comprise at least one latch which is adapted to retain the reservoir of the fluid container in fluidic communication with said engine fluid circulation system. The latch may be remotely operable to disconnect said fluid container from said vehicle engine fluid circulation system. In some examples the fluid container is elongate; said inlet, outlet and vent ports are located at a common first end of said container.

In general, self-sealing couplings have the characteristic that when the coupling is being connected, a seal is made between the connecting ports before valve or valves open to allow fluid to flow. On disconnection, the valve or valves close to seal off each of the ports before the coupling seal between the ports is broken.

Suitable self-sealing couplings of the system provide a "dry break" in which no fluid flows on connection or disconnection of the coupling. Alternatively, the self-sealing couplings of the system provide a "damp break" in which there is flow of only a non-essential amount of fluid, for example a few drips of liquid, on disconnection or connection of the coupling. Suitable self-sealing couplings include rallye raid SPT12 couplings available from Staubli. Other suitable types of self-sealing coupling are described in US 2005/0161628, US2008/0265574 and US2008/0088127.

According to at least some examples, each of the self-sealing couplings comprises a latch which is biased to a locking position to thereby retain the reservoir in fluidic communication with the engine fluid circulation system. This has an advantage that when the fluid container is positioned to connect it to the engine, the latches engage the corresponding ports on the engine and retain the fluid reservoir in fluidic communication with the fluid circulation system of the engine. In at least some examples each latch is remotely operable to disconnect the reservoir from the vehicle engine fluid circulation system.

In at least some examples, the self-sealing couplings also retain the fluid container on the engine. In at least some example, the self-sealing couplings also retains the fluid container on a manifold which is in fluidic communication with the fluid circulation system of the engine.

According to at least some embodiments each latch is operable by a remotely operable actuator, for example an electromagnetic actuator. This may operate one or more of the latches. Suitable electromagnetic actuators comprise a solenoid which comprises a central core which is a push or pull rod which is magnetically actuated.

Interlocks may be provided to prevent the engine from operating if the fluid container is disconnected from the engine fluid circulation system and/or to prevent the fluid container being disconnected from the engine if the engine is operating.

In at least some embodiments the engine fluid circulation system comprises one or more ports adapted to connect with the self-sealing couplings of the replaceable fluid container. In at least some examples, at least one (for example all) of the ports of the engine fluid circulation system comprises a non-return valve. Non-return valves may prevent fluid from draining back to the fluid container when the engine is not operating. In at least some examples the ports each comprise a control valve or shut-off valve which may be closed when the vehicle engine is not operating, for example to prevent or reduce fluid draining from the fluid container to the engine.

In at least some examples the engine fluid system comprises a vent port adapted to connect to a vent self-sealing coupling of the fluid container. Suitably, the vent port does not comprise any valves because fluid, for example gas and/or vapour, may be required to flow both to and from the reservoir of the container through the vent port or vent ports when the fluid container is connected to the engine fluid circulation system.

Suitably, the ports of the engine fluid circulation system are self-sealing ports. This has an advantage that when the fluid container has been disconnected from the engine, the risk of ingress of contaminants into the engine may be mitigated.

In at least some embodiments the fluid container comprises a filter for filtering the fluid. This is suitable when the fluid is an engine lubricating oil composition.

In at least some embodiments the fluid container is a container for a fluid which is a liquid. Suitable liquids include engine lubricating oil compositions, heat exchange fluids for example for an electric engine, de-icers, water, screen-washes, and detergents. The fluid may be a fluid suitable for a sustainable fluid system for example engine lubricating oil compositions and heat exchange fluids. The fluid may be a fluid suitable for a non-sustainable fluid system for example de-icers, water, screen-washes and detergents.

Suitably the fluid is a lubricating oil composition, for example an engine lubricating oil composition. In some embodiments the reservoir of the fluid container contains lubricating oil composition, for example engine lubricating oil composition. In this embodiment, the fluid container may be provided as a self-contained system containing fresh, refreshed or unused lubricating oil composition which may conveniently replace a fluid container on an engine containing used or spent lubricating oil composition. If the fluid container also comprises a filter, this also is replaced together with the spent or used lubricating oil composition.

According to at least some embodiments, the lubricating oil composition comprises at least one base stock and at least one engine lubricating oil additive. Suitable base stocks include bio-derived base stocks, mineral oil derived base stocks, synthetic base stocks and semi synthetic base stocks. Suitable lubricating oil composition additives, for example engine lubricating oil composition additives are known in the art. Suitable additives include organic and inorganic compounds. In at least some embodiments, in the engine lubricating oil composition comprises about 60 to 90% by weight in total of base stocks and about 40 to 10% by weight additives. In at least some embodiments, the engine lubricating oil composition is a lubricating oil composition for an internal combustion engine. Suitable lubricating oil compositions include mono-viscosity grade and multi-viscosity grade engine lubricating oil compositions. Suitable lubricating oil compositions include single purpose lubricating oil compositions and multi-purpose lubricating oil compositions.

Suitable lubricating oil compositions include engine lubricating oil compositions for internal combustion engines. Suitable engine lubricating oil compositions include lubricating oil compositions for spark ignition internal combustion engines. Suitable engine lubricating oil compositions include lubricating oil compositions for compression internal combustion engines.

According to at least some embodiments the fluid container is a container for heat exchange fluid for example for an electric engine. Thus, in at least some embodiments the fluid container contains heat exchange fluid for an electric engine. In at least some example, the replaceable fluid container is provided as a self-contained system containing fresh, refreshed or unused heat exchange fluid for an electric engine which conveniently replaces a system on an engine containing used or spent heat exchange fluid. If the fluid container also comprises a filter, this also is replaced together with the spent or used heat exchange fluid.

Electric engines may require heat exchange fluid to heat the engine and/or cool the engine. This may depend upon the operating cycle of the engine. Electric engines may also require a reservoir of heat exchange fluid. The fluid container may provide a heat storage system in which heat exchange fluid may be stored for use to heat the electric engine when required. The fluid container may provide a system for storage of coolant at a temperature below the operating temperature of the engine for use to cool the electric engine when required.

Suitable heat exchange fluids for electric engines include aqueous and non-aqueous fluids. In at least some examples heat exchange fluids for example for electric engines comprise organic and/or non-organic performance boosting additives. Suitable heat exchange fluids include man-made and bio-derived, for example Betaine fluids. Suitable heat exchange fluids include those which exhibit fire retarding characteristics and/or hydraulic characteristics. Suitable heat exchange fluids include phase change fluids. Suitable heat exchange fluids include molten metals and salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

In at least some examples the fluid container is adapted to operate at temperatures of from ambient temperature up to 200° C., suitably from −20° C. to 180° C., for example from −10° C. to 150° C.

In at least some examples the fluid container is adapted to operate at pressures of up to 15 barg, suitably from −0.5 barg to 10 barg, for example from 0 barg to 8 barg. According to another aspect of the present invention there is provided an engine control system comprising a container as herein described in combination with an engine comprising a fluid circulation system in which the reservoir of the container is in fluidic communication with the engine fluid circulation system.

In at least some embodiments the engine control device comprises a memory.

In at least some embodiments the engine control device comprises a microprocessor.

In at least some embodiments the engine is a vehicle engine. Suitable vehicles include motorcycles, earthmoving vehicles, mining vehicles, heavy duty vehicles and passenger cars.

According to another aspect of the present invention there is provided a vehicle comprising an engine, a fluid circulation system for said engine and a replaceable fluid container comprising a reservoir for holding fluid, at least one self-sealing coupling connecting said reservoir in fluidic communication with the fluid circulation system and a data module adapted to communicate with an engine control device when the reservoir is in fluidic communication with the fluid circulation system. Suitable fluid containers include replaceable fluid containers as hereindescribed, more suitably according to the present invention.

In at least some embodiments the engine is a vehicle engine. Suitable vehicles include motorcycles, earthmoving vehicles, mining vehicles, heavy duty vehicles and passenger cars.

The fluid container is advantageous where rapid replacement of the fluid is required or advantageous, for example in "off-road" and/or "in field" services.

According to a further aspect of the present invention, there is provided a method of supplying fluid to a vehicle engine comprising a fluid circulation system, which method comprises connecting to said fluid circulation system, a fluid container as herein described, in which the reservoir of the container contains fluid as herein described.

Whilst fluid containers, methods and control systems for engines, for example vehicle engines, have been described herein, the present invention also relates to fluid containers, methods and control systems for fluid systems of vehicles in general whether or not associated with an engine.

Thus, according to a further aspect of the present invention there is provided a replaceable fluid container for a vehicle, for example for a vehicle engine, the container comprising:
- a reservoir for holding a fluid;
- a fluid coupling adapted to provide fluidic communication between the reservoir and a fluid circulation system of a vehicle, for example of a vehicle engine; and
- a data provider arranged such that positioning the container to permit fluidic communication between the reservoir and the fluid circulation system arranges the data provider for data communication with a control device of the vehicle, for example with an engine control device of an engine on the vehicle.

While aspects of the invention have been described in relation to vehicle engines and examples of the invention described the use of engine lubricating oil compositions, it is envisaged that features of the invention could find other applications.

For example, a fluid container according to an aspect of the invention could be used in relation to a fluid system of a wide range of apparatus or equipment. For example, the fluid container could find application in relation to various static and movable machines, for example industrial machines such as a lathe, or manufacture and assembly equipment, to an engine, or to a vehicle.

Examples of a fluid container of an aspect of the invention could thus be used to supply lubricant composition to a region of the apparatus or equipment, for example to a region including one or more moving parts, for example a gearbox. In an example of an aspect of the invention there is provided a fluid container for a wind turbine, for example to provide lubricating composition to one or more parts of the wind turbine apparatus.

The container may supply a lubricant composition to the apparatus, or may supply fluid other than lubricant to the apparatus. For example, the fluid may comprise a fuel composition, for example gasoline or diesel The container of an aspect of the invention may be for supply the fluid for example to the fuel supply system of the apparatus. For example, the container may supply fuel to a vehicle, or tool, for example to a car, motorcycle or lawn mower.

In another example, the container is used to supply a fluid, for example lubricant and/or fuel, to a hand tool, for example a hedge trimmer or leaf blower.

The fluid may comprise for example an aqueous or other solvent-based composition, for example a cleaning composition. The fluid may for example comprise windscreen wash fluid. A container of an example of an aspect of the invention may be for supplying fluid to the windscreen washer fluid delivery system for example of a vehicle.

In some examples of aspects of the invention the fluid system may comprise a fluid circulation system or a fluid delivery system.

The invention extends to methods and/or apparatus substantially as herein described with reference to the accompanying drawings.

Any feature in one aspect of the invention may be applied to other aspects of the invention, in any appropriate combination. In particular, features of method aspects may be applied to apparatus aspects, and vice versa.

Embodiments of the invention will now be described, by way of example only, with reference to the accompanying drawings, in which.

In the drawings, like reference numerals are used to indicate like elements.

Figure 1:
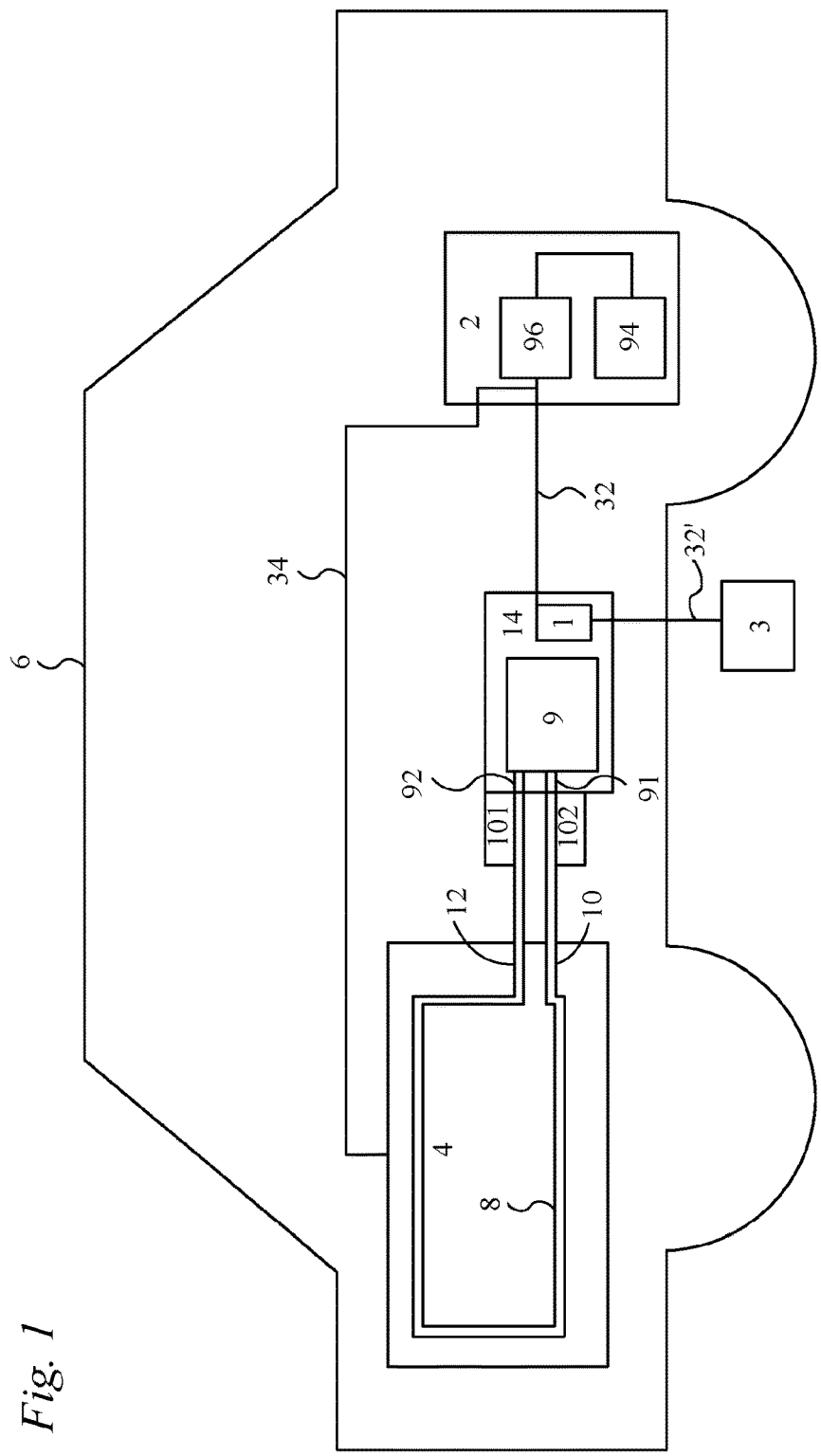
FIG. 1 shows a schematic illustration of a vehicle.

FIG. 1 shows a vehicle 6 comprising an engine 4, a fluid container 14 and an engine control device 2. The engine 4 comprises a fluid circulation system 8.

The fluid circulation system 8 is coupled to receive fluid from a supply line 10, and to return fluid that has circulated in the engine 4 via a fluid return line 12.

The fluid container 14 comprises a reservoir 9 for holding a fluid, and a data provider 1 for providing data about the fluid container 14. The data provider 1 is coupleable to provide data to the engine control device 2 via a first communication link 32 and/or via a remote communication link 32' to a remote control device 3. The fluid container 14 comprises a fluid outlet port 91 which is coupled to the reservoir 9. The outlet port 91 is coupleable to supply fluid to the engine's fluid circulation system 8 via a fluid supply line 10. The fluid inlet port 92 is coupleable to the fluid return line 12 to enable fluid to circulate from the reservoir 9, around the circulation system 8 of the engine 4, and back to the reservoir 9. The fluid container 14 is described in more detail below with reference to FIG. 2.

The ports 91, 92 of the fluid container 14 comprise self-sealing couplings, and the container comprises latches 101, 102 configured to secure the container 14 to the fluid supply line 10 and the fluid return line 12. The latches are operable to be released to enable the container 14 to be removed and replaced.

The engine control device 2 comprises a processor 96, and a memory 94 configured to store control data for the engine 4. The processor 96 is configured to monitor and to control the operation of the engine 4, via a second communication link 34. The processor 96 is configured to control operation of the engine 4 based on the monitoring, and based on the control data read from the memory 9. The engine control device 2 is further configured in some examples to obtain data from the data provider 1 via the communication link 32 and to control the engine based on the data obtained from the data provider 1.

In operation, the fluid container 14 is secured in fluid communication with the fluid circulation system 8 by the latches 101, 102. When the fluid container 14 is secured by the latches, the data provider 1 is coupled to communicate with the engine control device 2 by the first communication link 32. The engine control device 2 regulates operation of the engine 4 based on data obtained from the data provider 1 in combination with data obtained from monitoring operation of the engine 4, and data stored in the memory 94 of the engine control device 2.

Figure 2:
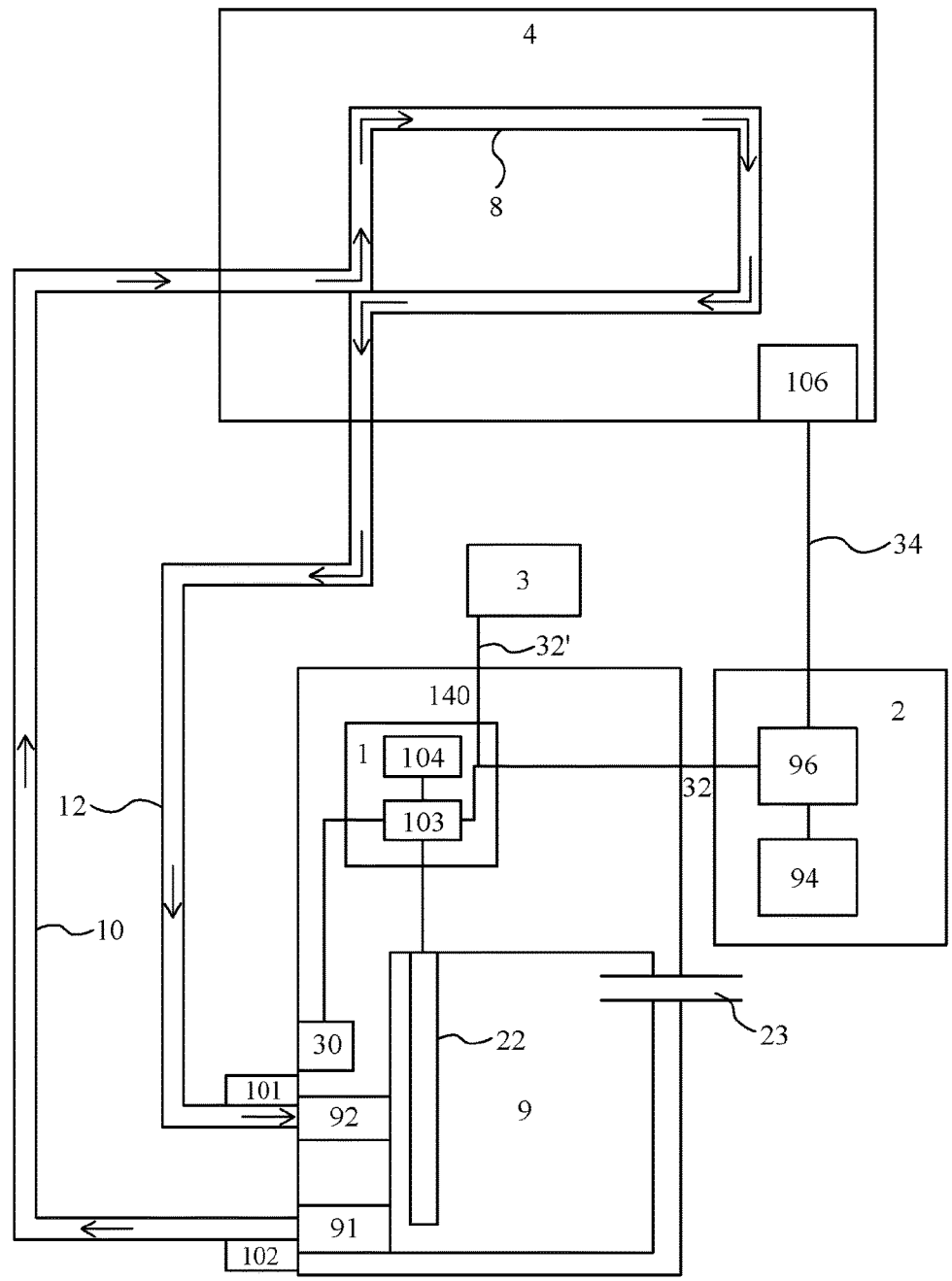
FIG. 2 shows a schematic illustration of components of the vehicle of FIG. 1

FIG. 2 shows a fluid container 140, an engine control device 2, and an engine 4, the features of any of which may be used in combination with those of the example shown in FIG. 1.

The fluid container 140 comprises a reservoir 9 for holding a fluid, and a vent 23 to enable pressure to be equalised in the reservoir 9 as fluid is drawn into and out from the reservoir 9. The fluid container 140 comprises latches 101, 102 and a latch sensor 30 for sensing when the latches 101, 102 are engaged to retain the fluid container 140 in fluid communication with the fluid circulation system 8

The fluid sensor 22 comprises two metallic strips separated from one another on a dip tube of the fluid container 14. The fluid sensor 30 senses the oil level in the reservoir 9 based on the capacitance of the strips to provide a signal indicative of the oil level to the data provider 1. The fluid sensor 22 is further configured to sense an electrical resistance of the fluid thereby to provide an indication of the presence of impurities in the fluid.

The data provider 1 of the fluid container 140 comprises a processor 103 arranged to receive signals from the fluid sensor 22 and the connection sensor 30, and to communicate data to the engine control device 2 via the communication link 32. The data provider 1 further comprises a memory 104 for storing data describing the fluid. In particular, the memory 104 stores data including at least one of: the grade of fluid, the type of fluid, the date on which the fluid was filled or replaced, a unique identifier of the container 140, an indication of whether the container is new, or has previously been refilled or replaced, an indication of the vehicle mileage, the number of times the container has been refilled or reused, and the total mileage for which the container has been used.

The engine 4 shown in FIG. 2 comprises an engine communication interface 106 arranged to communicate operational parameters of the engine, such as engine speed and throttle position to the processor 96 of the engine control device 2 via the communication link 34. The engine communication interface 106 is further operable to receive engine commands from the engine control device 2 and to modify operation of the engine 4 based on the received commands.

The memory 94 of the engine control device 2 comprises non-volatile memory configured to store:
 identifiers of acceptable fluids for use in the engine 4;
 data defining a first container fluid level threshold and a second fluid level threshold;
 data indicative of an expected container oil level based on the mileage of the vehicle;
 data defining a service interval, wherein the service interval is the time period between performing maintenance operations for the vehicle such as replacing the fluid;
 the vehicle mileage;
 sets of engine configuration data for configuring the engine to operate in a selected way;
 an association (such as a look up table) associating fluid identifiers with the sets of engine configuration data; and,
 data indicative of an expected oil quality based on the mileage of the vehicle.

The processor 96 is operable to compare data stored in the memory 94 with data obtained from the data provider 1 of the container 140 and from the communication interface 106 of the engine 4.

In operation, the processor 104 of the data provider 1 of the container provides an identifier of the fluid to the processor 96 of the engine control device 2. The processor 96 determines whether the correct fluid is in use based on the fluid identifier from the data provider 1, and the identifiers stored in the memory 94. In the event that the processor 96 determines that the container does not comprise an acceptable fluid, the processor 96 is configured to alert the user of the vehicle and/or to prevent operation of the engine 4. In the event that the processor 96 determines that the container does comprise an acceptable fluid, the engine control device 2 enables operation of the engine 2. This provides an electronic lock to inhibit unsafe or sub-optimal operation of the engine, and may detect and inhibit the use of counterfeit fluid products, or unauthorised refilling of the container 140.

If operation of the engine is enabled, the processor 96 obtains a set of configuration data for the engine 2 from the memory 94 based on the stored associations, and the fluid identifier provided by the data provider 1. This enables the operation of the engine to be configured or reconfigured according to the characteristics of the fluid. When the engine is running, the processor 96 is configured to communicate with the data provider 1, and in the event that the data provider indicates that the characteristics of the fluid have changed, the configuration of the engine may be adjusted in response to these changes. This enables the engine to adapt to real-time changes in the characteristics of the fluid.

The processor 103 of the container 140 is configured to obtain data indicating the expected fluid level based on the mileage since the fluid was last refilled, and to compare the fluid level sensed by the sensor 22 with stored data. In the event that this comparison indicates that the fluid level is changing more quickly than expected, the data provider 1 can be configured to send a signal to the engine control device 2 to modify a service interval for the vehicle based on this comparison.

The fluid may be any type of fluid circulated in the engine 4 to support a function of the engine, which may be an ancillary function of the engine. For example the fluid may be lubricant, or coolant, or de-icer, or any other fluid associated with the engine. As many different types and grades of such fluid are available, the data provider may comprise an identifier of the fluid.

The data provider 1 may comprise a memory storing an identifier of the fluid, and a communication interface to enable data stored in the memory of the data provider 1 to be passed via the communication link 32 to the processor 96 of the engine control device. The data provider 1 may comprise a computer readable identifier for identifying the fluid, the identifier may be an electronic identifier, such as a near field RF communicator, for example a passive or active RFID tag, or an NFC communicator.

The data provider 1 may be configured for one way communication. For example the data provider 1 may be configured only to receive data from the engine control device, so that the data can be provided to memory at the container. Alternatively the data provider 1 may be configured only to provide data to the engine control device. In some possibilities the data provider 1 is adapted to provide data to and receive data from the engine control device. The receiving and providing of data may be to, from or between (i) a memory/memories and/or processor(s) of the engine control device and (ii) the data provider and/or sensor(s) of the data provider and/or a memory/memories of the data provider.

Alternatively, or in addition, the data stored in the memory of data provider 1 may be passed via remote communication link 32' to a remote control device 3. The communication may be one way or two way.

The memory can store data comprising at least one property of the fluid selected from the group consisting of: the amount of fluid, the temperature of fluid, the pressure of fluid, the viscosity of fluid, the viscosity index of the fluid, the density of fluid, the electrical resistance of fluid, the dielectric constant of fluid, the opacity of fluid, the chemical composition of fluid, the origin of the fluid and combinations of two or more thereof. The memory may also be configured to receive data from an engine control device. This enables data to be stored at the container. Such stored data can then be provided from the memory to diagnostic devices during servicing and/or during replacement of the container. The amount of fluid includes the absence of the fluid.

The memory is optional. The computer readable identifier may be an optical identifier, such as a barcode, for example a two-dimensional barcode, or a colour coded marker, or optical identifier on the container. The computer readable identifier may be provided by a shape or configuration of the container 14. Regardless of how it is provided, the identifier may be encrypted.

The communication link 32 and/or 32' may be any wired or wireless communication link, and may comprise an optical link.

The latches 101, 102, are optional and the container 14, 140 may simply be fluid coupled to the circulation system. The container 14, 140 can be secured by gravity, an interference fit, a bayonet coupling, or any appropriate fixture. The data provider 1 may be positioned on the container 140 so that, when the container is coupled in fluidic communication with the fluid circulation system of the engine, the data provider 1 is also arranged to communicate data with the engine control device, and if the container is not positioned for fluidic communication with the fluid circulation system, communication with the data provider is inhibited.

The container 140 has been described as comprising particular types of sensors. However, one or both of these sensors may be omitted, e.g. as in FIG. 1 above. Where sensors are used any type of sensor, or combination of sensors can be used. For example, to sense the level of fluid in the container: a mechanical float, a position sensor, an electrical coil, capacitive sensors, resistivity sensors, ultrasonic level detection, visible or infra-red light detection, pressure sensing, or other sensors. The sensing system may provide information about the level in a continuous range between two fixed points or as discrete levels (e.g. full, half full, empty). Additionally, if the level of the liquid increased rapidly it could indicate some form of failure in the engine and provide an early warning mechanism to help prevent further damage to the engine. The containers 14, 140 may comprise sensors configured to sense at least one of a temperature, pressure, viscosity, density, electrical resistance, dielectric constant, opacity, chemical composition or amount of the container oil. It will further be appreciated that a plurality of fluid sensors could be provided, each to sense a different property of the fluid.

Information about the oil quality may be obtained through simple capacitance or resistivity measurements. These might, for example, indicate the presence of water in the oil or of metallic or carbonaceous particulates suspended in the oil.

The fluid container 14, 140 may be a container for an engine lubricating oil composition, a heat exchange fluid for cooling at least some working components of the engine 4, and/or heating some working components of the engine 4.

In the context of the present disclosure, those skilled in the art will appreciate that the fluid ports of the fluid container 14, 140 could comprise any suitable coupling for retaining the fluid container 14, 140 in fluid communication with the fluid circulation system 8. The port couplings could be arranged to be remotely decoupled from the fluid lines 10, 12 to place the fluid container 14 in its uncoupled configuration. It will further be appreciated that the fluid container 14 could comprise an actuator to decouple the fluid container 14, 140 from the circulation system 8.

Although circulated engine oil is described as being returned to the fluid container 14, 140 for recirculation, in the context of the present disclosure, those skilled in the art will appreciate that circulated engine oil could be collected and stored in a container coupled to the engine 4 and, when convenient, emptied from or otherwise removed from the vehicle 6.

Although the metallic strips of the sensor 22 are described as being on an oil dip tube, they may be located on an inner wall of the fluid container 14, 140.

A position sensor could be configured to provide signals indicative of a continuous range of oil levels between two predetermined values, for example a first value indicating the fluid container is full and a second value indicating the container is empty, or only for predetermined oil levels, such as "full", "half full" or "empty". The position sensor 30 could be configured to communicate continuously with the container module 16 or at selected time intervals or in response to a signal from the processor 96 of the engine control device.

In an example, an assessment is made of a fluid container 14 before it is installed in the vehicle 6. The fluid container 14 holds a liquid lubricating oil composition in the reservoir 9. The data provider 1 contains stored information relating to the lubricating oil composition in the reservoir 9. In this example, data provider 1 includes information as to the type of lubricating oil composition, for example according to the classification system xWy e.g. 5W30 and the origin of the lubricating oil composition. Prior to installation of the fluid container 14 in the vehicle 6, the remote control device 3 interrogates the fluid container and data is communicated from the data provider 1 to the control device 3 via the link 32', the data including the information that the composition is of type 5W30. In some examples, the remote control device 3 may then carry out an analysis of the suitability of a type 5W30 lubricating composition for the particular vehicle 6. In the case where the lubricant type is considered to be unsuitable, an output is generated indicating that the lubricant is unsuitable, for example a visual or audible notification. The container 14 is not installed in the vehicle 6. If the analysis determines that the lubricant composition is suitable, a appropriate output, is given, or there is an absence of a negative output, and installation proceeds.

Figure 3:
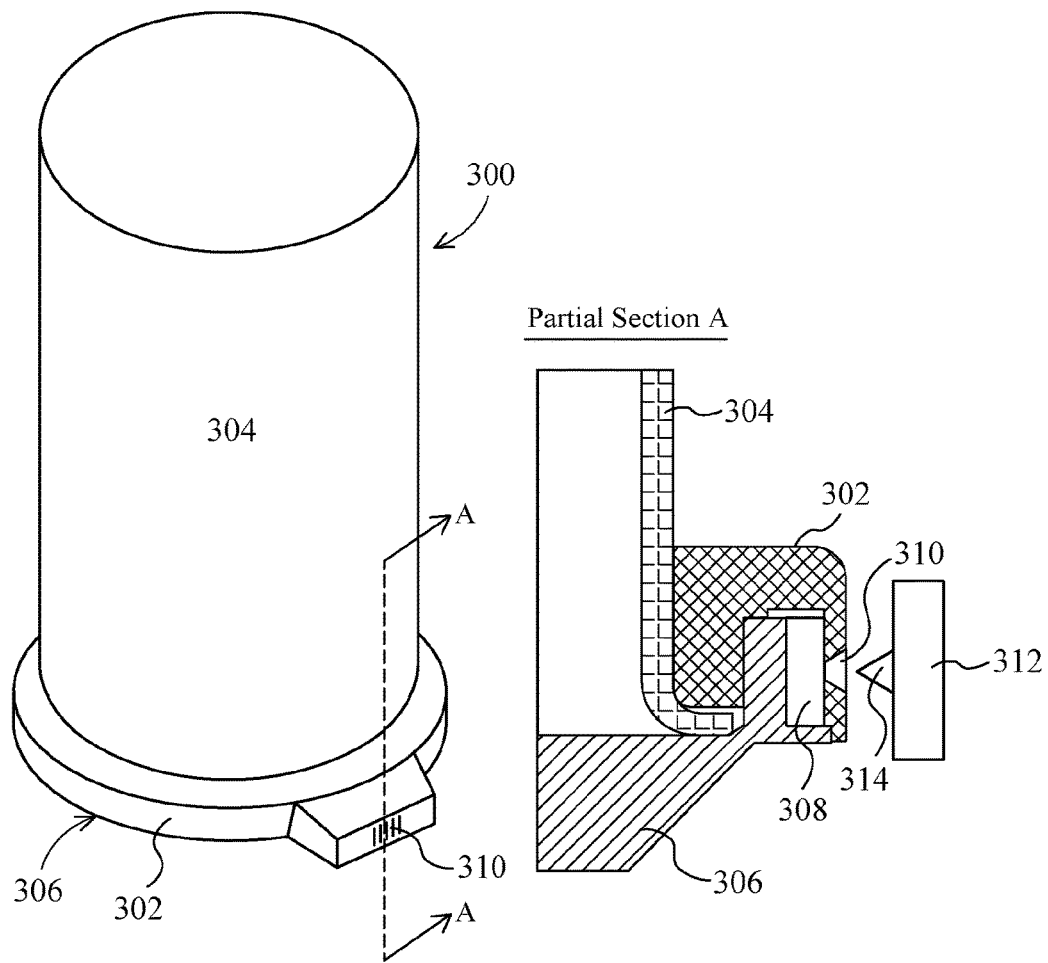
FIG. 3 shows in schematic elevation view, a replaceable fluid container for an engine and a partial section through a wall of the container.

FIG. 3 shows an elevation view of a fluid container 300 and a partial section through a wall of the container 300. The container 300 comprises a body 304, and a base 306. The body 304 is secured to the base by a lip 302. A data provider 308 is carried in the lip 302.

The lip 302 includes a data coupling 310 to enable the data provider 308 to be coupled to an interface 312 for communicating data with an engine control device (not shown in FIG. 3). The interface 312 comprises connectors 314 for connecting the interface 312 with the data provider 308 of the container 300.

The base 306 of the container 300 comprises a fluid coupling (not shown in FIG. 3) for coupling fluid from a reservoir of the fluid container with a fluid circulation system of an engine. The fluid coupling and the data coupling 310 are arranged so that connecting the fluid coupling in fluidic communication with the fluid circulation system of an engine also couples the data provider 308 for data communication with the engine control device via the interface 312 by seating the connectors 314 of the interface in the data coupling 310 on the container 310.

The interface 312 and the connectors 314 provide electrical connections for eight (8) channels which provide measurements for fluid temperature, fluid pressure, fluid quality, fluid type, and the level (e.g. amount) of fluid in the container. The connectors 314 may be arranged to provide electrical power to the data provider 308.

Although the example shown in FIG. 3 comprises conductive electrical connections 314 for communicating with the data provider 308 a contactless connection may also be used. For example, inductive or capacitive coupling can be used to provide contactless communication. One example of inductive coupling is provided by RFID, however other near field communications technology may also be used. Such couplings may enable electrical power to be transferred to the data provider 308, and also have the advantage that the data connection does not require any complex mechanical arrangement and the presence of dirt or grease on the couplings 310, 314 is less likely to inhibit communication with the data provider 308.

The container 300 may comprise a power provider such as a battery for providing electrical power to the data provider 308 this may enable the container 300 to be provided with a range of sensors, including sensors for fluid temperature, pressure and electrical conductivity. Where the container 300 comprises a filter sensors may be arranged to sense these parameters of the fluid as the fluid flows into the filter, and after the fluid has flowed through the filter.

The data provider 308 may be configured to provide information relating to the fluid in the container, for example, where the fluid is oil, the oil grade and/or type. The data provider may also provide data indicating the date on which the container was refilled, a unique serial number of the container, the length of time (e.g. number of hours) for which the container has been used, and whether the container holds new or refilled fluid.

The function of the processors 103, 96 may be provided by any appropriate controller, for example by analogue and/or digital logic, field programmable gate arrays, FPGA, application specific integrated circuits, ASIC, a digital signal processor, DSP, or by software loaded into a programmable general purpose processor. Aspects of the disclosure provide computer program products, and tangible non-transitory media storing instructions to program a processor to perform any one or more of the methods described herein.

Figure 4:
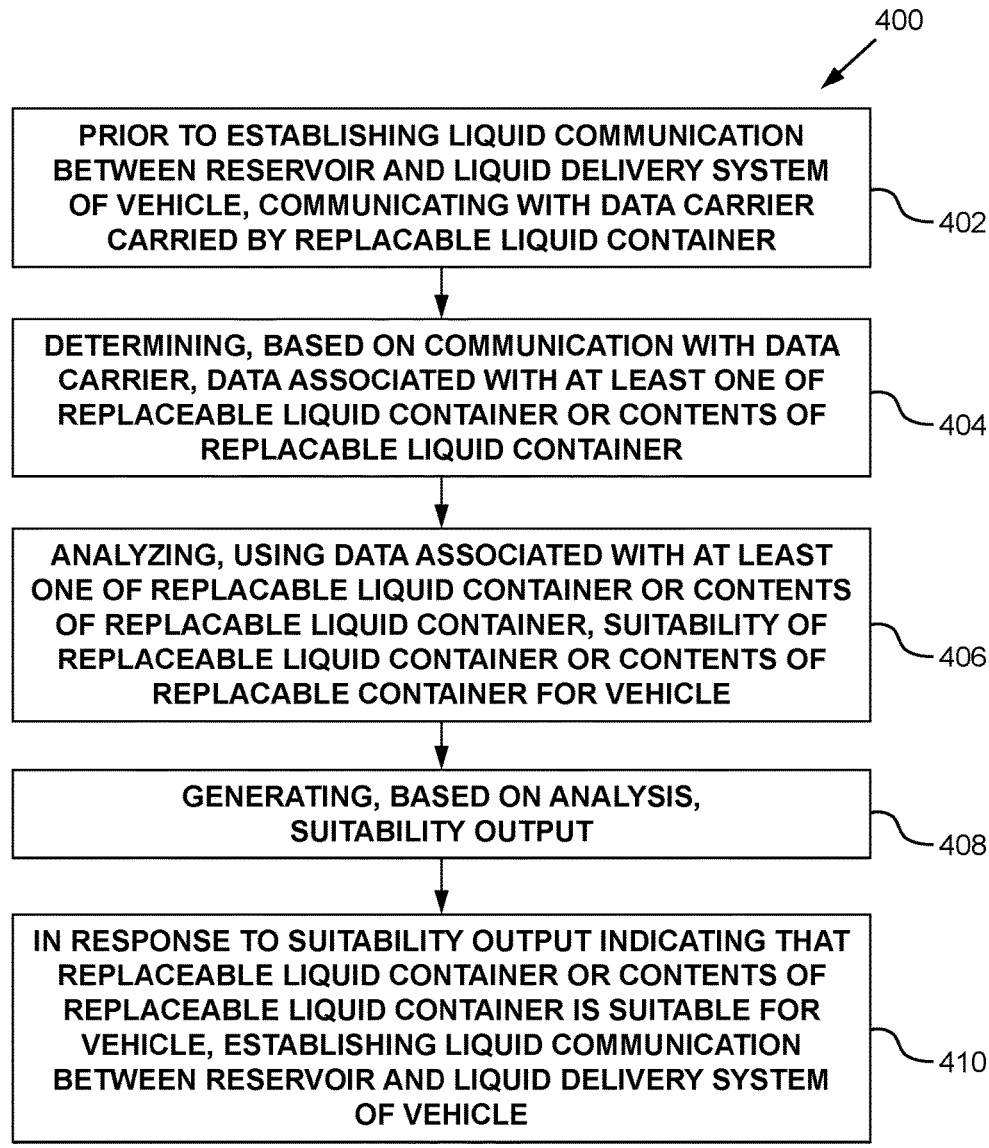
FIG. 4 shows a method.

FIG. 4 shows a method 400. At block 402, method 400 includes prior to establishing liquid communication between the reservoir and the liquid delivery system of the vehicle, communicating with a data carrier carried by the replaceable liquid container. At block 404, method 400 includes determining, based on the communication with the data carrier, data associated with at least one of the replaceable liquid container or contents of the replaceable liquid container. At block 406, method 400 includes analyzing, using the data associated with at least one of the replaceable liquid container or contents of the replaceable liquid container, suitability of the replaceable liquid container or the contents of the replaceable liquid container for the vehicle. At block 408, method 400 includes generating, based on the analysis, a suitability output. At block 410, method 400 includes in response to the suitability output indicating that the replaceable liquid container or the contents of the replaceable liquid container is suitable for the vehicle, establishing liquid communication between the reservoir and the liquid delivery system of the vehicle.

Figure 5:
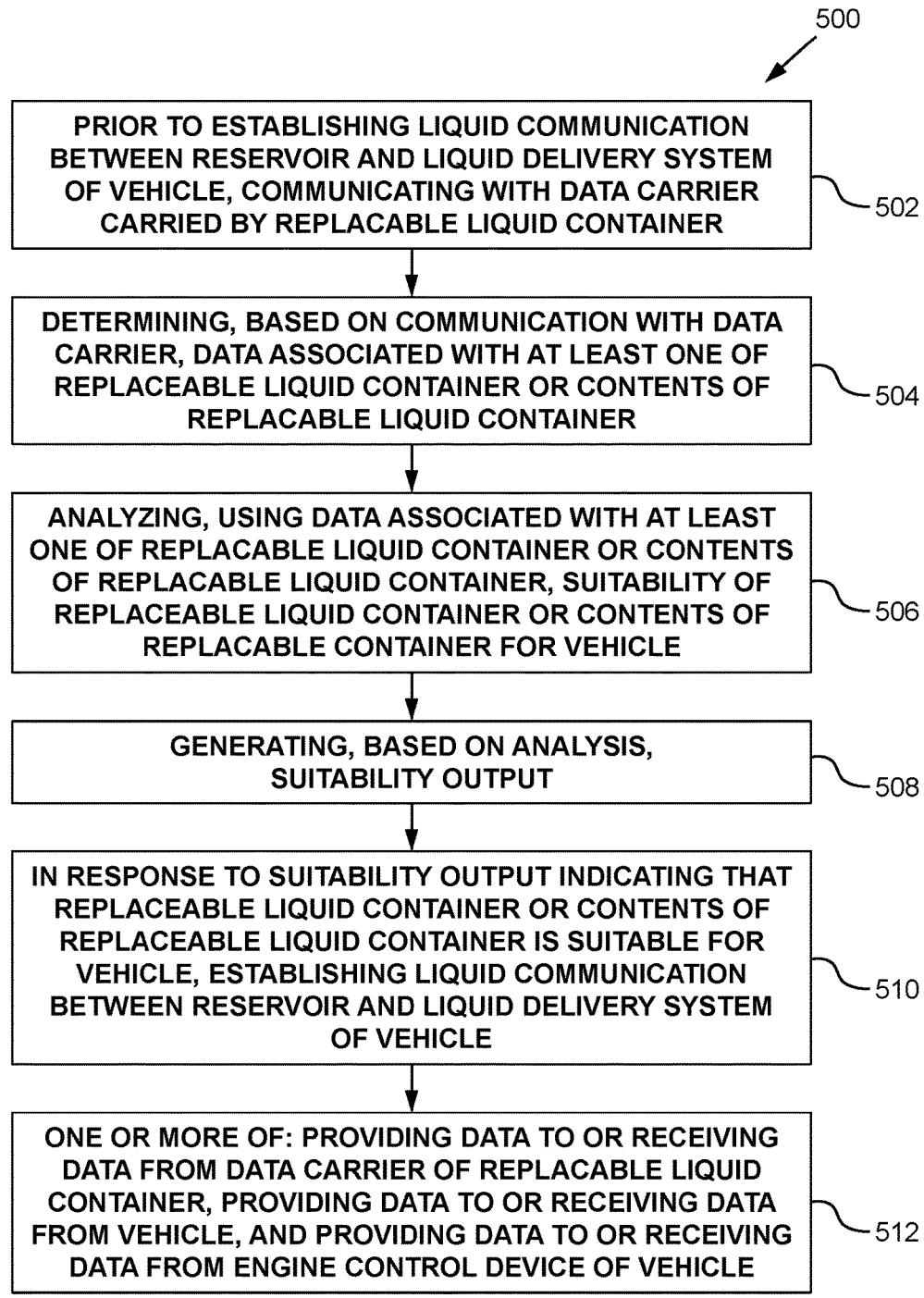
FIG. 5 shows another method.

FIG. 5 shows a method 500. At block 502, method 500 includes prior to establishing liquid communication between the reservoir and the liquid delivery system of the vehicle, communicating with a data carrier carried by the replaceable liquid container. At block 504, method 500 includes determining, based on the communication with the data carrier, data associated with at least one of the replaceable liquid container or contents of the replaceable liquid container. At block 506, method 500 includes analyzing, using the data associated with at least one of the replaceable liquid container or contents of the replaceable liquid container, suitability of the replaceable liquid container or the contents of the replaceable liquid container for the vehicle. At block 508, method 500 includes generating, based on the analysis, a suitability output. At block 510, method 500 includes in response to the suitability output indicating that the replaceable liquid container or the contents of the replaceable liquid container is suitable for the vehicle, establishing liquid communication between the reservoir and the liquid delivery system of the vehicle. At block 512, method 500 includes one or more of: providing data to or receiving data from the data carrier of the replaceable liquid container, providing data to or receiving data from the vehicle, and providing data to or receiving data from an engine control device of the vehicle.

Figure 6:
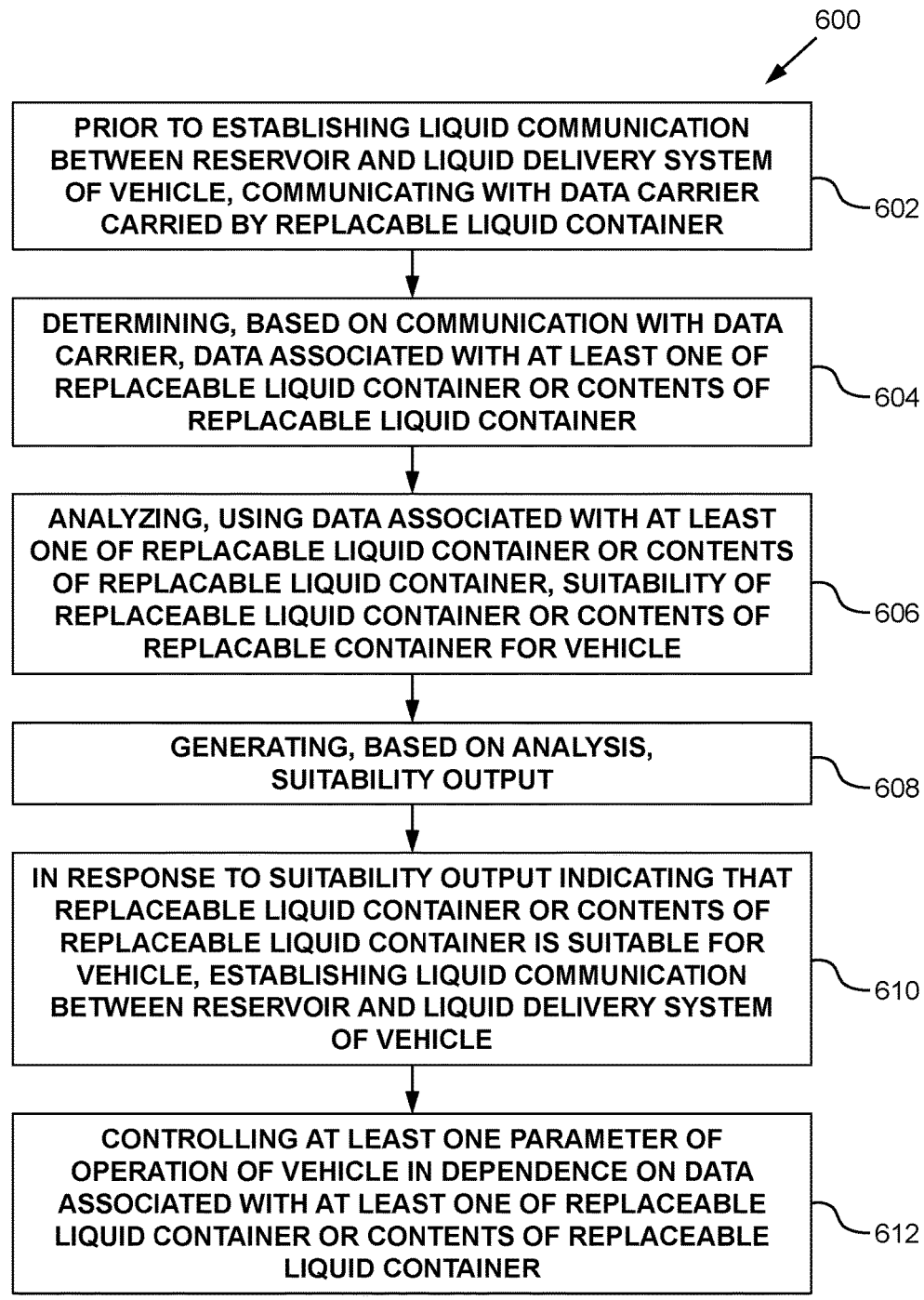
FIG. 6 shows another method.

FIG. 6 shows a method 600. At block 602, method 600 includes prior to establishing liquid communication between the reservoir and the liquid delivery system of the vehicle, communicating with a data carrier carried by the replaceable liquid container. At block 604, method 600 includes determining, based on the communication with the data carrier, data associated with at least one of the replaceable liquid container or contents of the replaceable liquid container. At block 606, method 600 includes analyzing, using the data associated with at least one of the replaceable liquid container or contents of the replaceable liquid container, suitability of the replaceable liquid container or the contents of the replaceable liquid container for the vehicle. At block 608, method 600 includes generating, based on the analysis, a suitability output. At block 610, method 600 includes in response to the suitability output indicating that the replaceable liquid container or the contents of the replaceable liquid container is suitable for the vehicle, establishing liquid communication between the reservoir and the liquid delivery system of the vehicle. At block 612, method 600 includes controlling at least one parameter of the operation of the vehicle in dependence on the data associated with at least one of the replaceable liquid container or contents of the replaceable liquid container.

Figure 7:
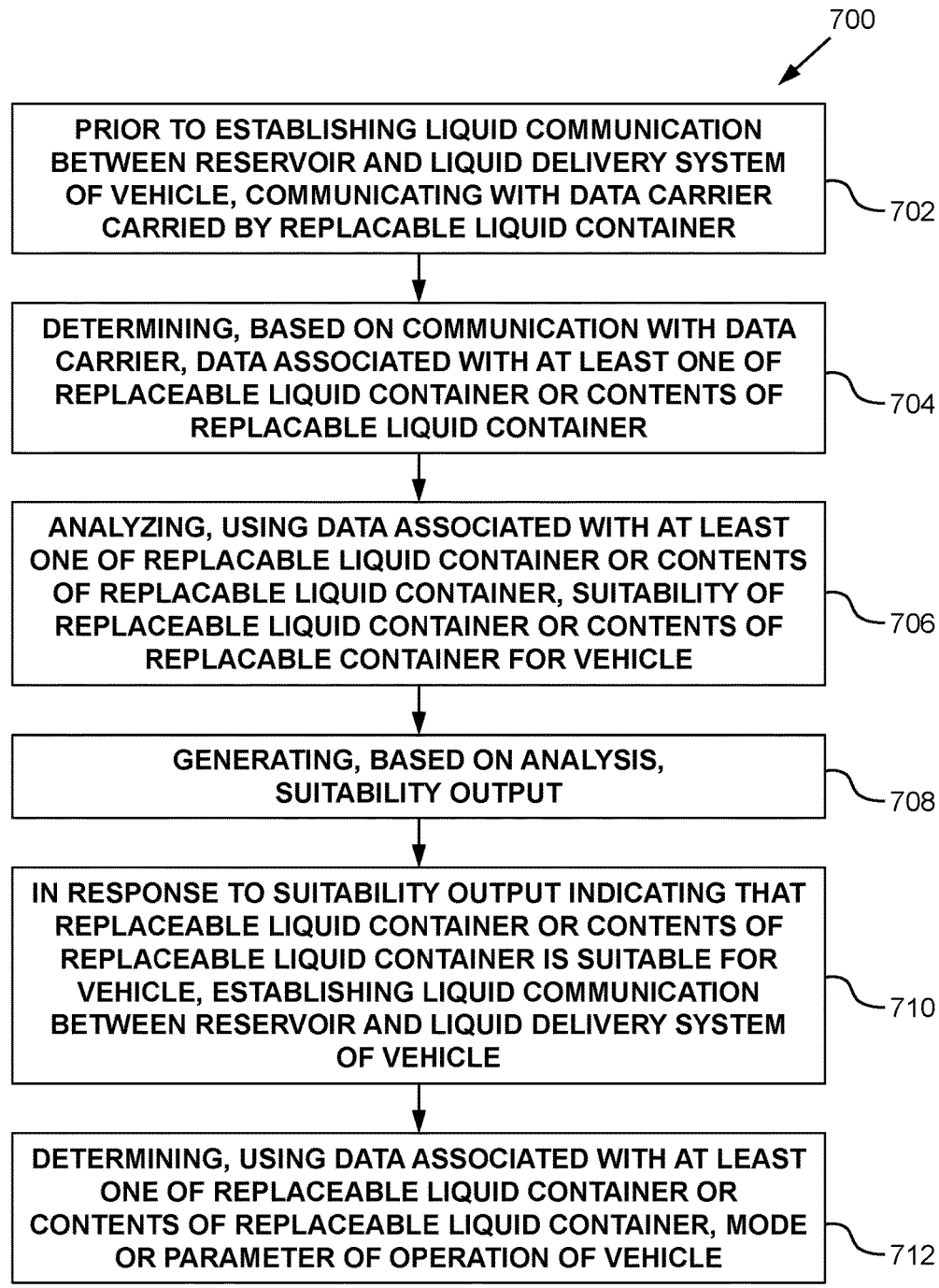
FIG. 7 shows another method.

FIG. 7 shows a method 700. At block 702, method 700 includes prior to establishing liquid communication between the reservoir and the liquid delivery system of the vehicle, communicating with a data carrier carried by the replaceable liquid container. At block 704, method 700 includes determining, based on the communication with the data carrier, data associated with at least one of the replaceable liquid container or contents of the replaceable liquid container. At block 706, method 700 includes analyzing, using the data associated with at least one of the replaceable liquid container or contents of the replaceable liquid container, suitability of the replaceable liquid container or the contents of the replaceable liquid container for the vehicle. At block 708, method 700 includes generating, based on the analysis, a suitability output. At block 710, method 700 includes in response to the suitability output indicating that the replaceable liquid container or the contents of the replaceable liquid container is suitable for the vehicle, establishing liquid communication between the reservoir and the liquid delivery system of the vehicle. At block 712, method 700 includes determining, using the data associated with at least one of the replaceable liquid container or contents of the replaceable liquid container, a mode or parameter of operation of the vehicle.

Figure 8:
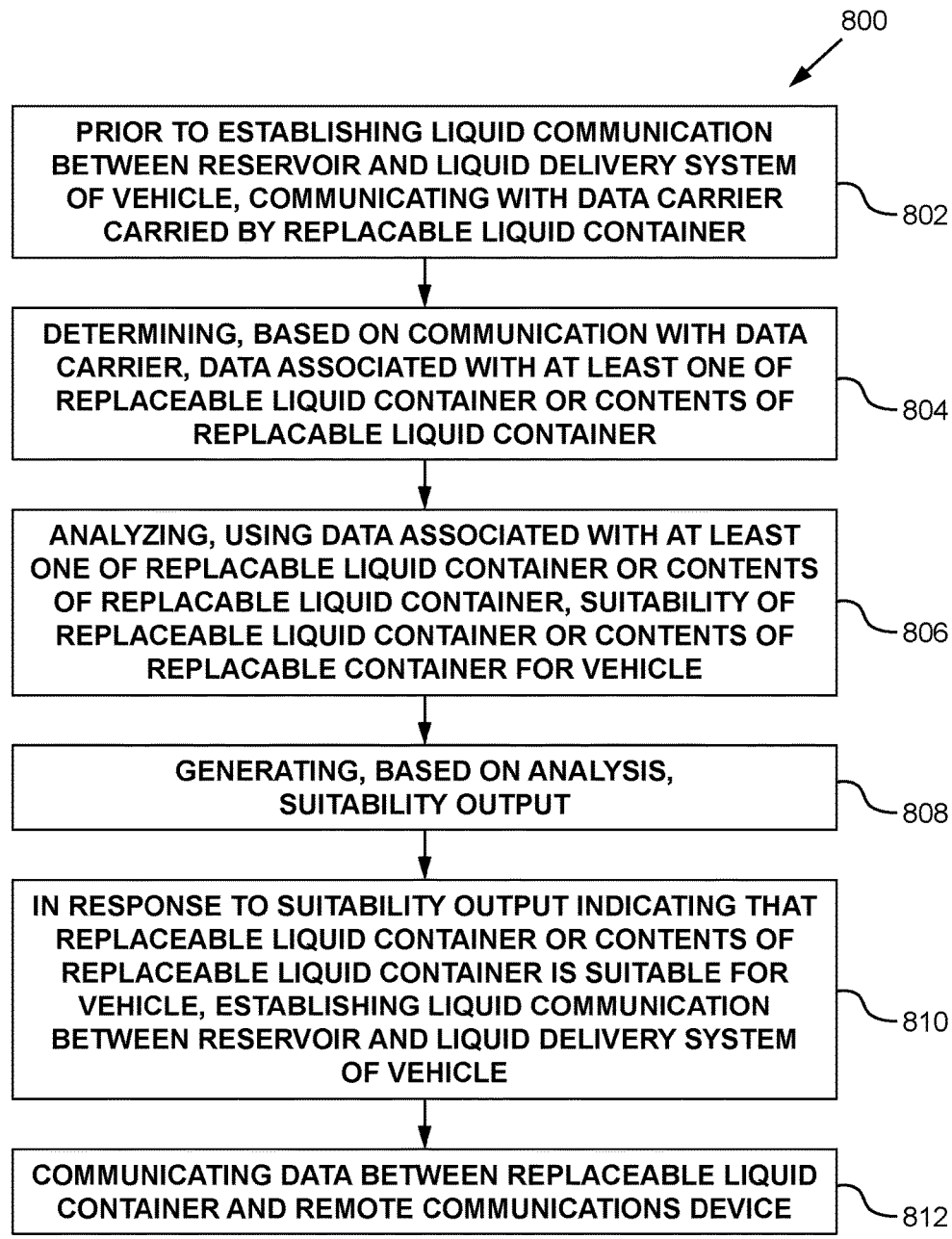
FIG. 8 shows another method.

FIG. 8 shows a method 800. At block 802, method 800 includes prior to establishing liquid communication between the reservoir and the liquid delivery system of the vehicle, communicating with a data carrier carried by the replaceable liquid container. At block 804, method 800 includes determining, based on the communication with the data carrier, data associated with at least one of the replaceable liquid container or contents of the replaceable liquid container. At block 806, method 800 includes analyzing, using the data associated with at least one of the replaceable liquid container or contents of the replaceable liquid container, suitability of the replaceable liquid container or the contents of the replaceable liquid container for the vehicle. At block 808, method 800 includes generating, based on the analysis, a suitability output. At block 810, method 800 includes in response to the suitability output indicating that the replaceable liquid container or the contents of the replaceable liquid container is suitable for the vehicle, establishing liquid communication between the reservoir and the liquid delivery system of the vehicle. At block 812, method 800 includes communicating data between the replaceable liquid container and a remote communications device.

Figure 9:
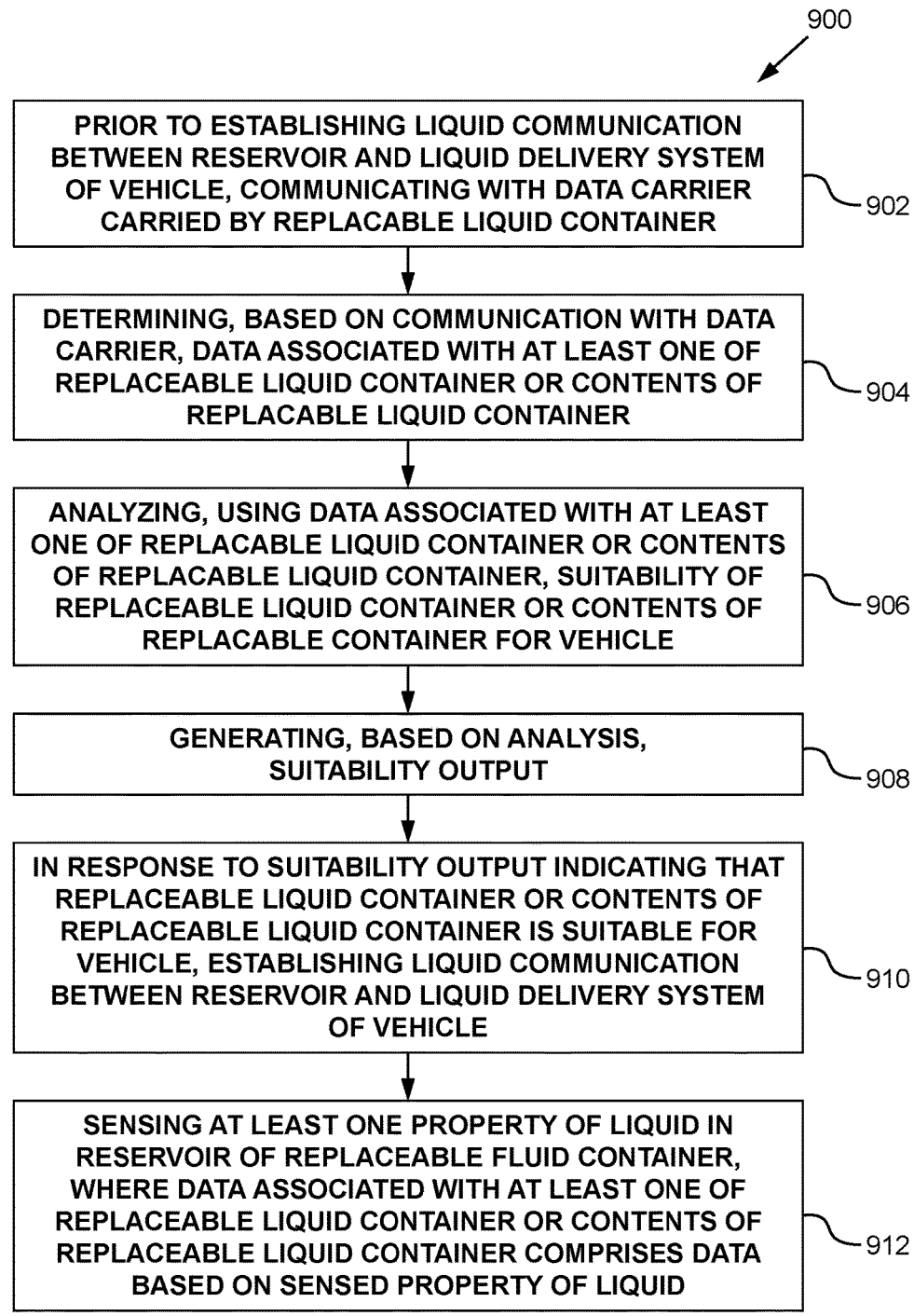
FIG. 9 shows another method.

FIG. 9 shows a method 900. At block 902, method 900 includes prior to establishing liquid communication between the reservoir and the liquid delivery system of the vehicle, communicating with a data carrier carried by the replaceable liquid container. At block 904, method 900 includes determining, based on the communication with the data carrier, data associated with at least one of the replaceable liquid container or contents of the replaceable liquid container. At block 906, method 900 includes analyzing, using the data associated with at least one of the replaceable liquid container or contents of the replaceable liquid container, suitability of the replaceable liquid container or the contents of the replaceable liquid container for the vehicle. At block 908, method 900 includes generating, based on the analysis, a suitability output. At block 910, method 900 includes in response to the suitability output indicating that the replaceable liquid container or the contents of the replaceable liquid container is suitable for the vehicle, establishing liquid communication between the reservoir and the liquid delivery system of the vehicle. At block 912, method 900 includes sensing at least one property of the liquid in the reservoir of the replaceable fluid container, wherein the data associated with at least one of the replaceable liquid container or contents of the replaceable liquid container comprises data based on the sensed property of the liquid.

Figure 10:
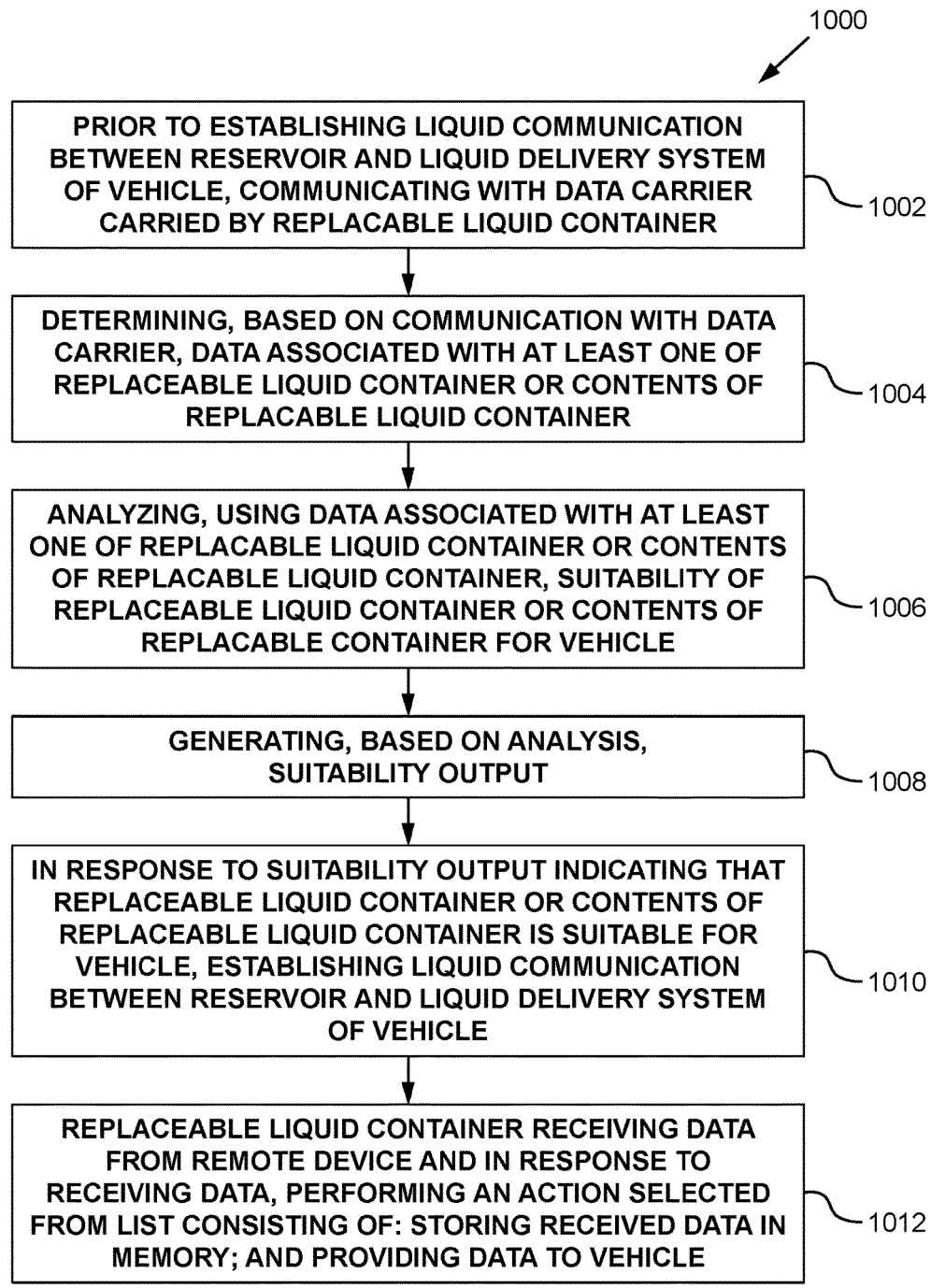
FIG. 10 shows another method.

FIG. 10 shows a method 1000. At block 1002, method 1000 includes prior to establishing liquid communication between the reservoir and the liquid delivery system of the vehicle, communicating with a data carrier carried by the replaceable liquid container. At block 1004, method 1000 includes determining, based on the communication with the data carrier, data associated with at least one of the replaceable liquid container or contents of the replaceable liquid container. At block 1006, method 1000 includes analyzing, using the data associated with at least one of the replaceable liquid container or contents of the replaceable liquid container, suitability of the replaceable liquid container or the contents of the replaceable liquid container for the vehicle. At block 1008, method 1000 includes generating, based on the analysis, a suitability output. At block 1010, method 1000 includes in response to the suitability output indicating that the replaceable liquid container or the contents of the replaceable liquid container is suitable for the vehicle, establishing liquid communication between the reservoir and the liquid delivery system of the vehicle. At block 1012, method 1000 includes the replaceable liquid container receiving data from a remote device and in response to receiving the data, performing an action selected from the list consisting of: storing the received data in the memory; and providing data to the vehicle.

Figure 11:
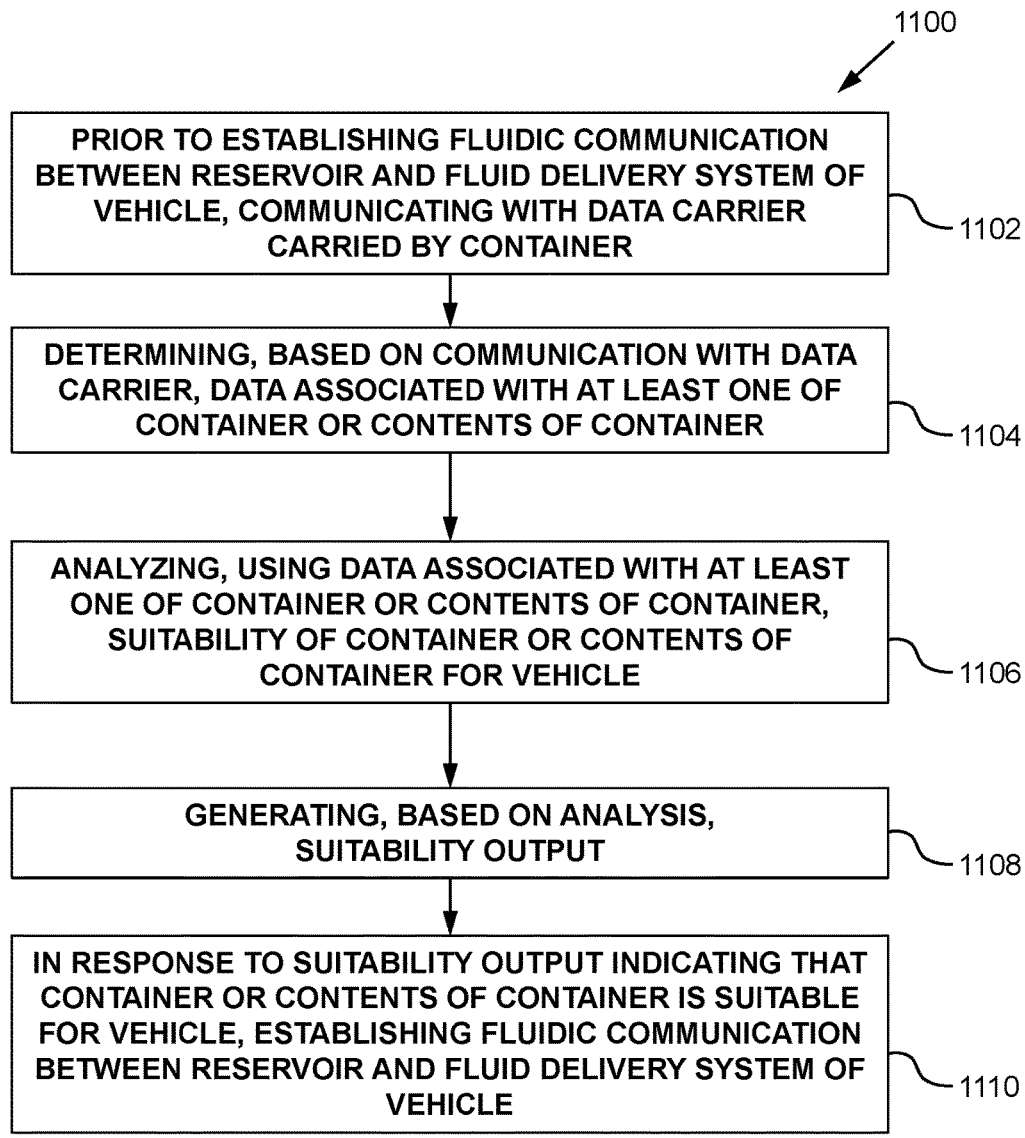
FIG. 11 shows another method.

FIG. 11 shows a method 1100. At block 1102, method 1100 includes prior to establishing fluidic communication between the reservoir and the fluid delivery system of the apparatus, communicating with a data carrier carried by the container. At block 1104, method 1100 includes determining, based on the communication with the data carrier, data associated with the container or contents of the container. At block 1106, method 1100 includes analyzing, using the data associated with the container or contents of the container, suitability of the container or the contents of the container for the apparatus. At block 1108, method 1100 includes generating, based on the analysis, a suitability output. At block 1110, method 1100 includes in response to the suitability output indicating that the container or the contents of the container is suitable for the apparatus, establishing fluidic communication between the reservoir and fluid delivery system of the apparatus.

Other variations and modifications of the apparatus will be apparent to persons of skill in the art in the context of the present disclosure.

The invention claimed is:

1. A method of supplying liquid to a liquid delivery system in a vehicle in which a replaceable liquid container including a reservoir containing liquid is releasably coupled in the vehicle to provide liquid communication between the reservoir and the liquid delivery system of the vehicle during operation of the vehicle, the method including:

(i) prior to establishing liquid communication between the reservoir and the liquid delivery system of the vehicle, communicating with a data carrier carried by the replaceable liquid container;

(ii) determining, based on the communication with the data carrier, data associated with at least one of the replaceable liquid container or contents of the replaceable liquid container;

(iii) analyzing, using the data associated with at least one of the replaceable liquid container or contents of the replaceable liquid container, suitability of the replaceable liquid container or the contents of the replaceable liquid container for the vehicle;

(iv) generating, based on the analysis, a suitability output; and (v) in response to the suitability output indicating that the replaceable liquid container or the contents of the replaceable liquid container is suitable for the vehicle, establishing liquid communication between the reservoir and the liquid delivery system of the vehicle.

2. The method according to claim 1, in which the liquid is an ancillary liquid of the vehicle.

3. The method according to claim 1, in which the liquid is selected from the group consisting of: a lubricant, a hydraulic fluid, a pneumatic fluid, a washer fluid, and a fuel additive.

4. The method according to claim 1, in which the liquid delivery system comprises a fluid circulation system.

5. The method according to claim 1, wherein the liquid delivery system is a lubricant system.

6. The method according to claim 1, including one or more of: providing data to or receiving data from the data carrier of the replaceable liquid container, providing data to or receiving data from the vehicle, and providing data to or receiving data from an engine control device of the vehicle.

7. The method according to claim 1, further including controlling at least one parameter of the operation of the vehicle in dependence on the data associated with at least one of the replaceable liquid container or contents of the replaceable liquid container.

8. The method according to claim 1, further including determining, using the data associated with at least one of the replaceable liquid container or contents of the replaceable liquid container, a mode or parameter of operation of the vehicle.

9. The method according to claim 1, further including communicating data between the replaceable liquid container and a remote communications device.

10. The method according to claim 1, further including sensing at least one property of the liquid in the reservoir of the replaceable fluid container, wherein the data associated with at least one of the replaceable liquid container or contents of the replaceable liquid container comprises data based on the sensed property of the liquid.

11. The method according to claim 10, in which the property of the liquid includes at least one property selected from the group consisting of: the amount of liquid, the temperature of liquid, the pressure of liquid, the viscosity of liquid, the density of liquid, the electrical resistance of liquid, the dielectric constant of liquid, the opacity of liquid, and the chemical composition of liquid.

12. The method according to claim 1, in which the data carrier comprises a memory for storing data.

13. The method according to claim 12, in which the memory comprises stored data comprising data based on at least one property of the liquid selected from the group consisting of: the amount of liquid, the temperature of liquid, the pressure of liquid, the viscosity of liquid, the viscosity index of the liquid, the density of liquid, the electrical resistance of liquid, the dielectric constant of liquid, the opacity of liquid, the chemical composition of liquid, and the origin of the liquid.

14. The method according to claim 12, in which the memory comprises stored data comprising data based on at least one sensed property of the liquid.

15. The method according to claim 12, in which the replaceable liquid container receives data from a remote device and in response to receiving the data, performs an action selected from the list consisting of: storing the received data in the memory; and providing data to the vehicle.

16. The method according to claim 1, wherein analyzing, using the data associated with at least one of the replaceable liquid container or contents of the replaceable liquid container, suitability of the replaceable liquid container or the contents of the replaceable liquid container for the vehicle is carried out remote from the replaceable liquid container.

17. A container for use in the method according to claim 1.

18. The method according to claim 1, wherein the data associated with at least one of the replaceable liquid container or contents of the replaceable liquid container comprises data associated with the condition of the replaceable liquid container or the history of the replaceable liquid container.

19. The method according to claim 1, wherein the method is carried out by the vehicle.

20. The method according to claim 1, wherein the vehicle comprises an engine control device, and wherein the method is carried out by the engine control device.

21. A method of supplying fluid to a fluid delivery system in an apparatus in which a container including a reservoir containing fluid is coupled in the apparatus to provide fluidic communication between the reservoir and the fluid delivery system of the apparatus during operation of the apparatus, the method including:

(i) prior to establishing fluidic communication between the reservoir and the fluid delivery system of the apparatus, communicating with a data carrier carried by the container;

(ii) determining, based on the communication with the data carrier, data associated with the container or contents of the container;

(iii) analyzing, using the data associated with the container or contents of the container, suitability of the container or the contents of the container for the apparatus;

(iv) generating, based on the analysis, a suitability output; and (v) in response to the suitability output indicating that the container or the contents of the container is suitable for the apparatus, establishing fluidic communication between the reservoir and the fluid delivery system of the apparatus.

22. The method according to claim 21, wherein the fluid delivery system comprises a fluid circulation system.

23. The method according to claim 21, wherein the method is carried out by the apparatus.

* * * * *